United States Patent
Hino

(10) Patent No.: US 8,185,504 B2
(45) Date of Patent: May 22, 2012

(54) IMAGE PROCESSING APPARATUS AND IMAGE PROCESSING METHOD

(75) Inventor: Yasuhiro Hino, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 629 days.

(21) Appl. No.: 12/170,840

(22) Filed: Jul. 10, 2008

(65) Prior Publication Data

US 2009/0019074 A1    Jan. 15, 2009

(30) Foreign Application Priority Data

Jul. 13, 2007   (JP) ................................. 2007-184655

(51) Int. Cl.
*G06F 17/00* (2006.01)
(52) U.S. Cl. ....................................... 707/662; 707/664
(58) Field of Classification Search .................. 707/662, 707/664
See application file for complete search history.

(56) References Cited

U.S. PATENT DOCUMENTS

| | | | |
|---|---|---|---|
| 5,532,839 A * | 7/1996 | Beikirch et al. | 358/401 |
| 5,923,013 A | 7/1999 | Suzuki et al. | |
| 7,612,921 B2 * | 11/2009 | Okabe et al. | 358/403 |
| 7,676,501 B2 * | 3/2010 | Wilson | 707/999.201 |
| 7,809,695 B2 * | 10/2010 | Conrad et al. | 707/692 |
| 7,847,990 B2 * | 12/2010 | Kawai | 358/540 |
| 7,908,332 B2 * | 3/2011 | Malik | 709/206 |
| 2006/0007481 A1 | 1/2006 | Kato et al. | |
| 2006/0095527 A1 * | 5/2006 | Malik | 709/206 |

FOREIGN PATENT DOCUMENTS

| | | |
|---|---|---|
| JP | 10-027076 | 1/1998 |
| JP | 2006-023942 | 1/2006 |

\* cited by examiner

*Primary Examiner* — Mohammad Ali
*Assistant Examiner* — John Hocker
(74) *Attorney, Agent, or Firm* — Cowan, Liebowitz & Latman, P.C.

(57) ABSTRACT

An image processing apparatus including: a correspondence determination unit configured to refer to respective additional information data included in a file and another file and determine whether identical additional information data exists; a size determination unit configured to compare a combined size of the two files with a reference size when judged that identical additional data exists; a flag addition unit configured to add a flag indicating data exempt from search target to identical additional information data included in either one of the two files when judged that the combined size is smaller than the reference size; a deletion unit configured to delete identical additional information data included in either one of the two files when judged that the combined size is equal to or greater than the reference size; and a storing unit configured to store a combined file.

7 Claims, 22 Drawing Sheets

IMAGE PROCESSING APPARATUS AND IMAGE PROCESSING METHOD

BACKGROUND OF THE INVENTION

1. Field of the Invention

The present invention relates to an image processing apparatus for transmitting and receiving print data between apparatuses via a network.

2. Description of the Related Art

Conventionally, a technique referred to as remote copying is widely used in which image data inputted from a network-connected image input apparatus such as a scanner is outputted to a separate image output apparatus typified by a printer or the like. Generally, remote copying refers to processing in which a scan operation and a print operation among a conventional copy operation are respectively performed by different network devices, such as printing/outputting from an image output apparatus an original image read at an image input apparatus. On the other hand, processing in which operations from scanning to printing are performed by the same apparatus is referred to as local copying.

For example, in a case where a printing function of an image input apparatus is executing print processing of another job and is therefore unable to handle local copying, a remote copying function can commit the print operation to another apparatus on a network. In addition, in a case where a copy output is to be distributed to a user at a remote location, using a remote copying function and printing/outputting a copy to an apparatus installed near the user can save manhours that would otherwise be required for distribution.

Various techniques have been developed regarding such remote copying, including the technique disclosed in Japanese Patent Laid-Open No. 2006-23942 presented below in which bitmap data inputted by scanning or the like is converted into resolution-independent vector data. When executing remote copying, using such a technique enables a remote copy to be transmitted to an image output apparatus in vector data format. Furthermore, in this case, since the image output apparatus renders the vector data into bitmap data, it is no longer necessary to perform resolution conversion of bitmap data. Therefore, image deterioration due to resolution conversion processing of bitmap data can be prevented and high-quality remote copying can be achieved.

In addition, a box function is well known in which an image inputted from an image input apparatus is saved as a file in a secondary storage or the like in an image output apparatus. By using such a box function, a user is able to retrieve and repeatedly print/output a saved file at a desired time. With the box function, data types of files that can be saved in the image output apparatus are the above-described bitmap data and vector data. In addition, when the number of files saved by the box function increases, it is conceivable that a file search function becomes necessary in order to enable print/output object files to be easily selected. When performing a search, it is conceivable that a method is used which retains, as a file search keyword, secondary information referred to as metadata and which is obtained when converting bitmap data into vector data and the like.

There may be cases where a file searched by a user is actually a combination of a plurality of files. For example, file combination is performed when the user decides to staple a plurality of documents together when setting finish processing. When a plurality of files is combined, not only the contents of print data desired by the user but the aforementioned secondary information are also combined. At this point, when files having the same contents are combined, secondary information having the same contents is duplicated. As a result, file search speed decreases.

Japanese Patent Laid-Open No. H10-27076 described below discloses a print control apparatus capable of sharing common data among a plurality of print jobs and realizing efficient data processing and data storage. However, the issue of a reduction in search speed of files stored in a storage device is not addressed therein.

SUMMARY OF THE INVENTION

The present invention provides an image processing apparatus capable of increasing search speed of combined files.

An image processing apparatus according to the present invention stores a file in a storage area, and includes: a correspondence determination unit configured to refer to respective additional information data included in the file and another file and determine whether identical additional information data exists when an instruction is issued by a user operation to combine the two files; a size determination unit configured to compare a combined size of the two files with a reference size when the correspondence determination unit determines that identical additional information data exists; a flag addition unit configured to add a flag indicating data exempt from search target to identical additional information data included in either one of the two files when the size determination unit determines that the combined size is smaller than the reference size; a deletion unit configured to delete corresponding additional information data included in either one of the two files when the size determination unit determines that the combined size is equal to or greater than the reference size; and a storing unit configured to store a combined file newly generated as a result of the flag addition unit or the deletion unit in the storage area.

According to the present invention, an increase in the search speed of combined files can be achieved.

Further features of the present invention will become apparent from the following description of exemplary embodiments with reference to the attached drawings.

DESCRIPTION OF THE EMBODIMENTS

Figure 1:
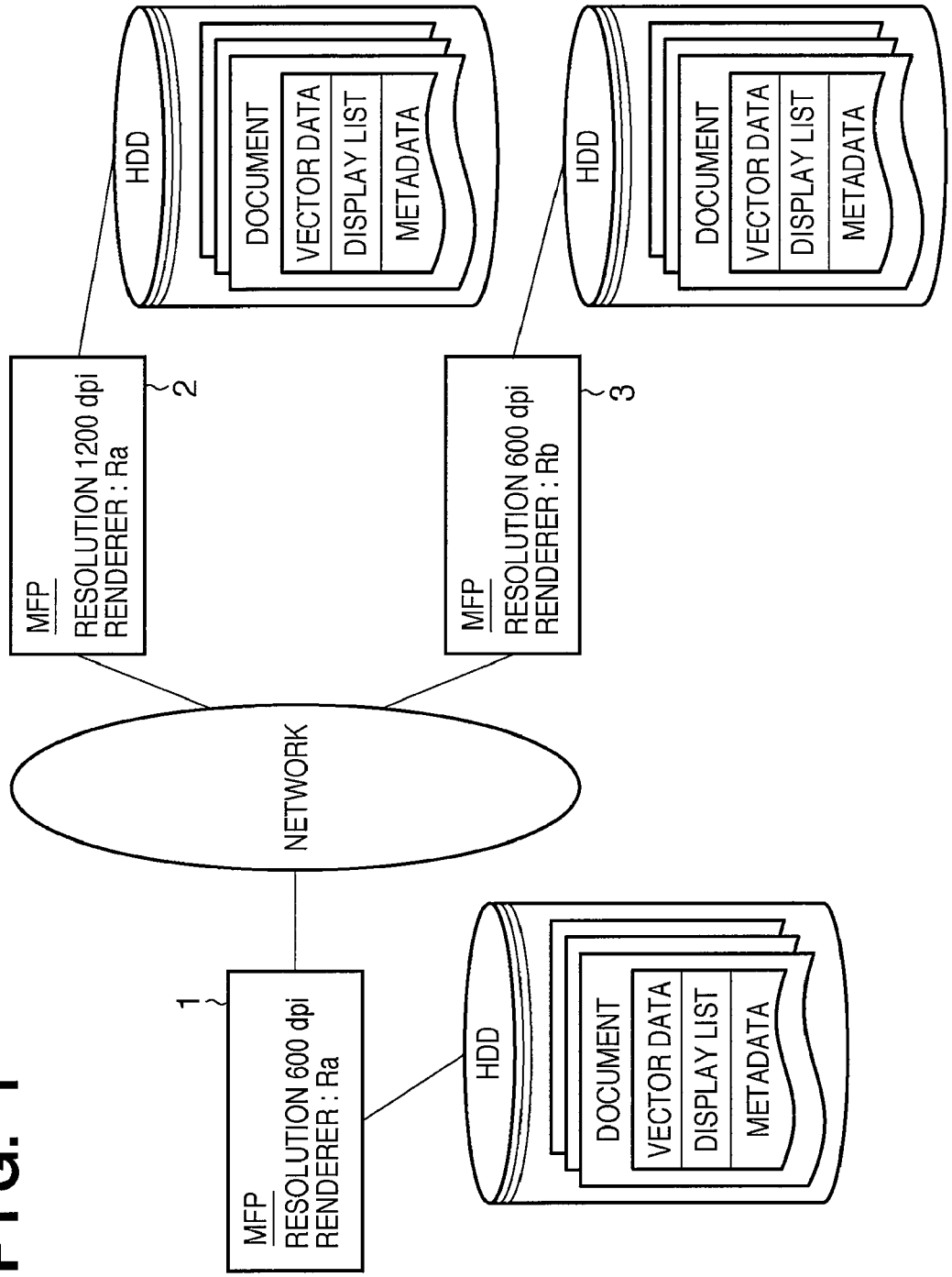
FIG. 1 is a diagram showing an overall configuration of an image processing system according to an embodiment of the present invention.

A preferred embodiment for implementing the present invention will now be described in detail with reference to the drawings. Like components shall be assigned like reference numerals and descriptions thereof shall be omitted.

FIG. 1 is a diagram showing an overall configuration of an image processing system according to an embodiment of the present invention. As shown in FIG. 1, in the present image processing system, an image processing apparatus 1, an image processing apparatus 2 and an image processing apparatus 3 are connected via a network such as a LAN. In the present embodiment, 1D color MFPs (multifunction peripherals) are used as the image processing apparatuses 1 to 3. An MFP refers to a complex device in which are combined various functions such as printer functions, copier functions, fax functions, and scanner functions. Hereinafter, an image processing apparatus will also be referred to as an MFP. In FIG. 1, the MFP 1, the MFP 2 and the MFP 3 are respectively provided with secondary storages (storage areas). In this case, for example, a hard disk drive may be used as the secondary storage.

The MFP 1, the MFP 2 and the MFP 3 shown in FIG. 1 are respectively provided with unique printer engines. Therefore, the printer engines of the MFP 1, MFP 2 and the MFP 3 respectively have different output resolutions (hereinafter referred to as resolutions). In the present invention, for example, the resolutions of the printer engines of the MFP 1 and the MFP 3 are 600 dpi and the resolution of the printer engine of the MFP 2 is 1200 dpi. In addition, the MFP 1, the MFP 2 and the MFP 3 are respectively provided with unique renderers. Also referred to as a rasterizer, a renderer is typically configured by hardware such as an ASIC, and is capable of processing a group of rendering commands to perform rendering into bitmap data. A group of rendering commands processed by a renderer is generally called a display list, and can be generated by software from vector data described as complicated rendering information. In addition, since such display lists can be processed by hardware, the lists are resolution-dependent data that depend on the resolution of a printer engine mounted on an apparatus. On the other hand, since vector data is resolution-independent, in the present embodiment, such data will also be referred to as resolution-independent data. In FIG. 1, renderers provided in the MFP 1 and the MFP 2 are denoted as "RA" while the renderer provided in the MFP 3 is denoted as "RB". The MFP 1, the MFP 2 and the MFP 3 shown in FIG. 1 are able to communicate with each other using a network protocol. In the case of FIG. 1, for example, a general-purpose PC, a server and a printer may be connected to the network.

Figure 2:
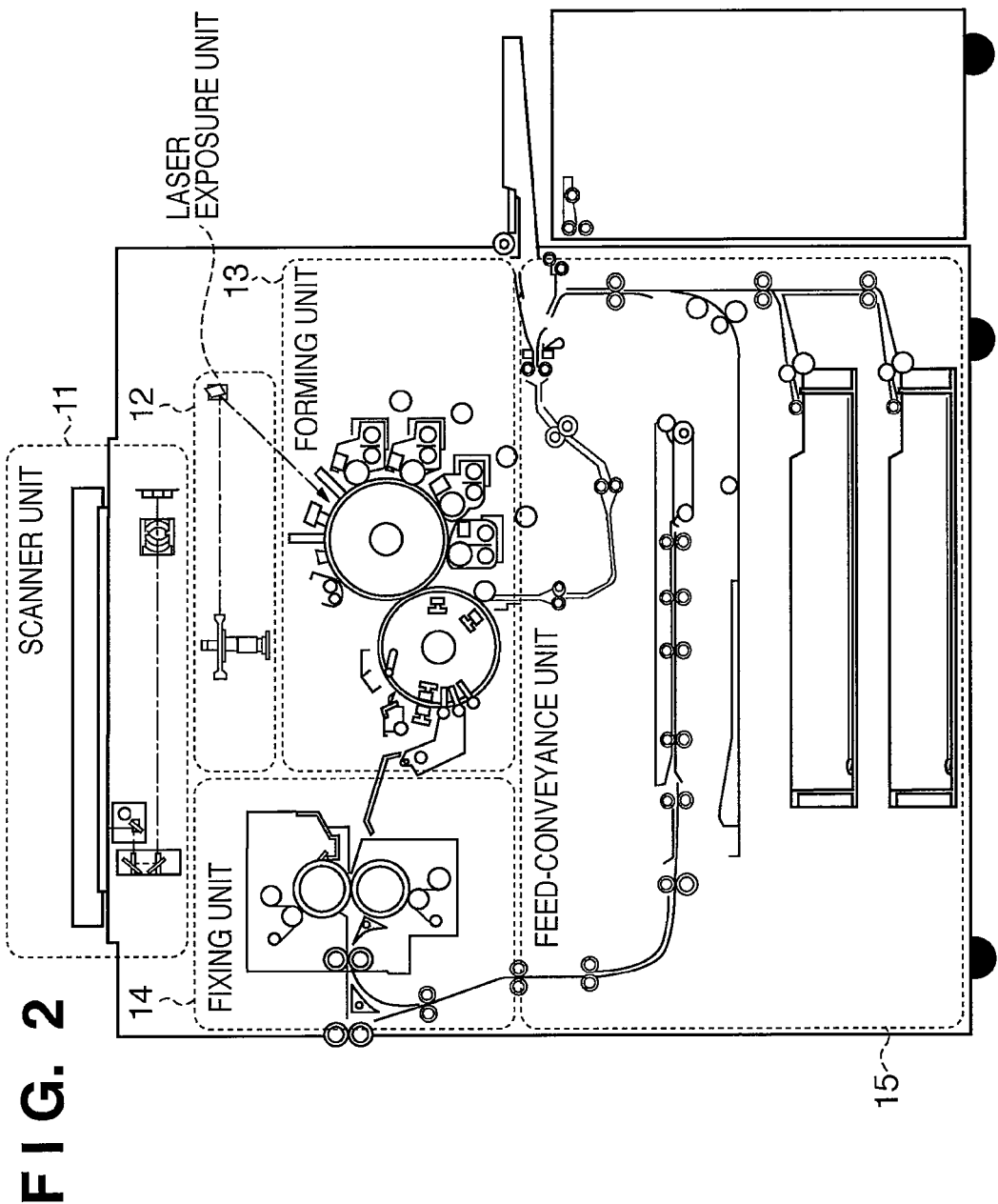
FIG. 2 is a diagram showing an overall configuration of an MFP according to the present embodiment.

FIG. 2 is a diagram showing an overall configuration of an MFP according to the present embodiment. As shown in FIG. 2, the MFP 1 includes a scanner unit 11, a laser exposure unit 12, an image forming unit 13, a fixing unit 14, a feed-conveyance unit 15, and a printer control unit, not shown. The scanner unit 11 irradiates light to an original placed on a platen to optically read an image on the original, and converts the image of the original into an electric signal to generate image data (input data). The laser exposure unit 12 directs light such as laser light modulated according to the generated image data to a rotating polygon mirror that rotates at a constant angular speed, and irradiates reflected scanning light to a photoconductive drum. The image forming unit 13 rotationally drives the photoconductive drum and electrically charges the same using a charger. In addition, the image forming unit 13 develops, using a toner, a latent image formed on the photoconductive drum by the laser exposure unit. The developed toner image is transferred onto a sheet. Minute toner particles remaining on the photoconductive drum are collected. Imaging is performed at the image forming unit 13 by executing the above-described series of electrophotographic processes. During the period in which the sheet conveyed from the feed-conveyance unit 15 wraps itself around a predetermined position on a transfer belt and rotates four times, respective developing units having toners of magenta (M), cyan (C), yellow (Y) and black (K) take turns repeating the electrophotographic processes. Consequently, the sheet on which is transferred a full-color toner image of four colors detaches itself from the transfer drum and is conveyed to the fixing unit 14. The fixing unit 14 is constituted by a combination of a roller and a belt and includes a built-in heat source such as a halogen heater. Toner on the sheet on which the toner image had been transferred by the image forming unit 13 is melted and fixed by heat and pressure at the fixing unit 14. The feed-conveyance unit 15 is provided with at least one sheet repository such as a sheet cassette or a paper deck. In response to an instruction from the printer control section(not shown) one sheet is separated from the plurality of sheets stored in the sheet repository and conveyed to the image forming unit 13 or the fixing unit 14. The sheet conveyed to the image forming unit 13 wraps itself around the transfer drum and rotates four times, and is subsequently conveyed to the fixing unit 14. As already described, during the period in which the sheet rotates four times, toner images in the respective colors of magenta, cyan, yellow and black are transferred on to the sheet. In addition, when forming images on both sides of the sheet, the sheet is controlled so as to be once again conveyed to the image forming unit 13 after passing through the fixing unit 14. The printer control unit, not shown, controls the scanner unit 11, the laser exposure unit 12, the image forming unit 13, the fixing unit 14 and the feed-conveyance unit 15 while communicating with an MFP control unit that controls the entire MFP 1.

Figure 3:
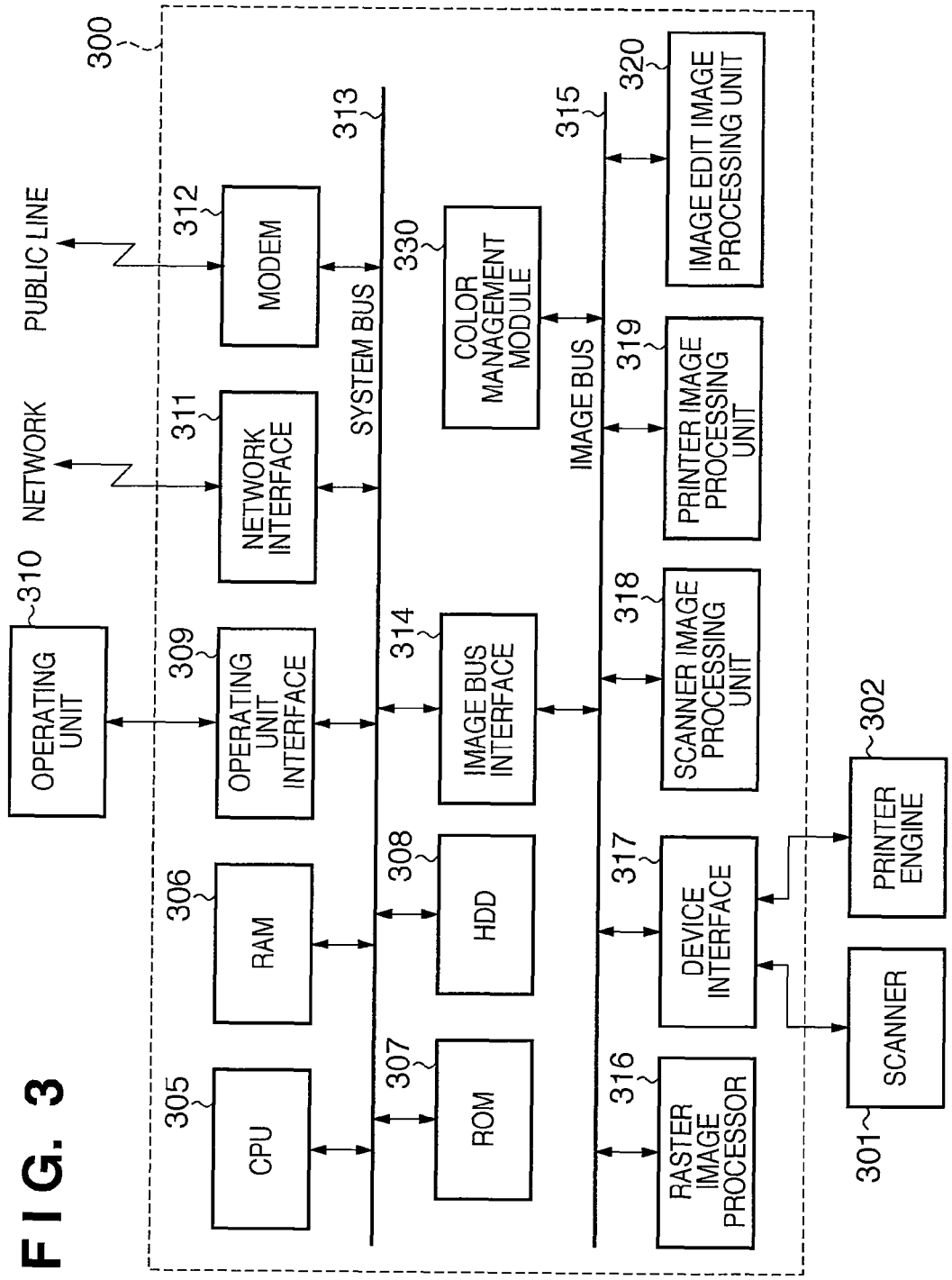
FIG. 3 is a block diagram showing a configuration of a control unit of an MFP.

FIG. 3 is a block diagram showing a configuration of a control unit of an MFP. A control unit 300 is connected to a scanner 301 that is an image input device and a printer engine 302 that is an image output device, and controls the same so as to read or print/output image data. In addition, the control unit 300 is connected to a network or a public line and performs control so that image information, device information and the like are inputted/outputted via the network or the public line.

A CPU 305 is a central processing device for controlling the entire MFP 1. A RAM 306 is a system work memory used by the CPU 305 when operational, and is also used as an image memory for temporarily storing inputted image data. A ROM 307 is a boot ROM and stores, for example, a system boot program. An HDD 308 is a hard disk drive capable of storing, for example, system software for performing various processing, and inputted image data. An operating unit interface 309 is an interface between an operating unit 310 that is provided with a display screen capable of displaying image data and the like, and is able to output operation screen data to the operating unit 310. In addition, the operating unit interface 309 supplies information inputted by the user at the operating unit 310 to the CPU 305. A network interface 311 is constituted by, for example, a LAN card, and enables information input/output to/from an external device by connecting to a LAN. Furthermore, a modem 312 is connected to a public line and enables information input/output to/from an external device. The above-described function blocks from the CPU 305 to the modem 312 are connected to a system bus 313 and are capable of communicating with each other.

An image bus interface 314 is a bus bridge connecting the system bus 313 with an image bus 315 that transfers image data at high speed, and allows conversions of data structures of the system bus 313 and the image bus 315. As shown in FIG. 1, connected to the image bus 315 are a raster image processor 316, a device interface 317, a scanner image processing unit 318, a printer image processing unit 319, an image edit image processing unit 320, and a color management module 330. The raster image processor 316 is capable of rendering PDL (Page Description Language) codes or vector data into images. The device interface 317 connects the scanner 301 and the printer engine 302 to a control unit 300, and is capable of converting between synchronous and asynchronous communication of image data. The scanner image processing unit 318 performs processing such as correction, data processing, and editing on image data inputted from the scanner 301. The printer image processing unit 319 performs processing such as correction and resolution conversion in accordance with the printer engine 302 on image data to be printed/outputted. The image edit image processing unit 320 performs image processing such as rotation and compression/expansion on image data. The color management module 330 is a dedicated hardware module that performs color conversion processing based on a profile or calibration data on image data. In this case, a profile refers to information for converting color image data expressed as an apparatus-dependent color space to an apparatus-independent color space such as the "L*a*b* color model". In addition, calibration data refers to data used when modifying color reproductive characteristics of the scanner 301 and the printer engine 302.

Figure 4:
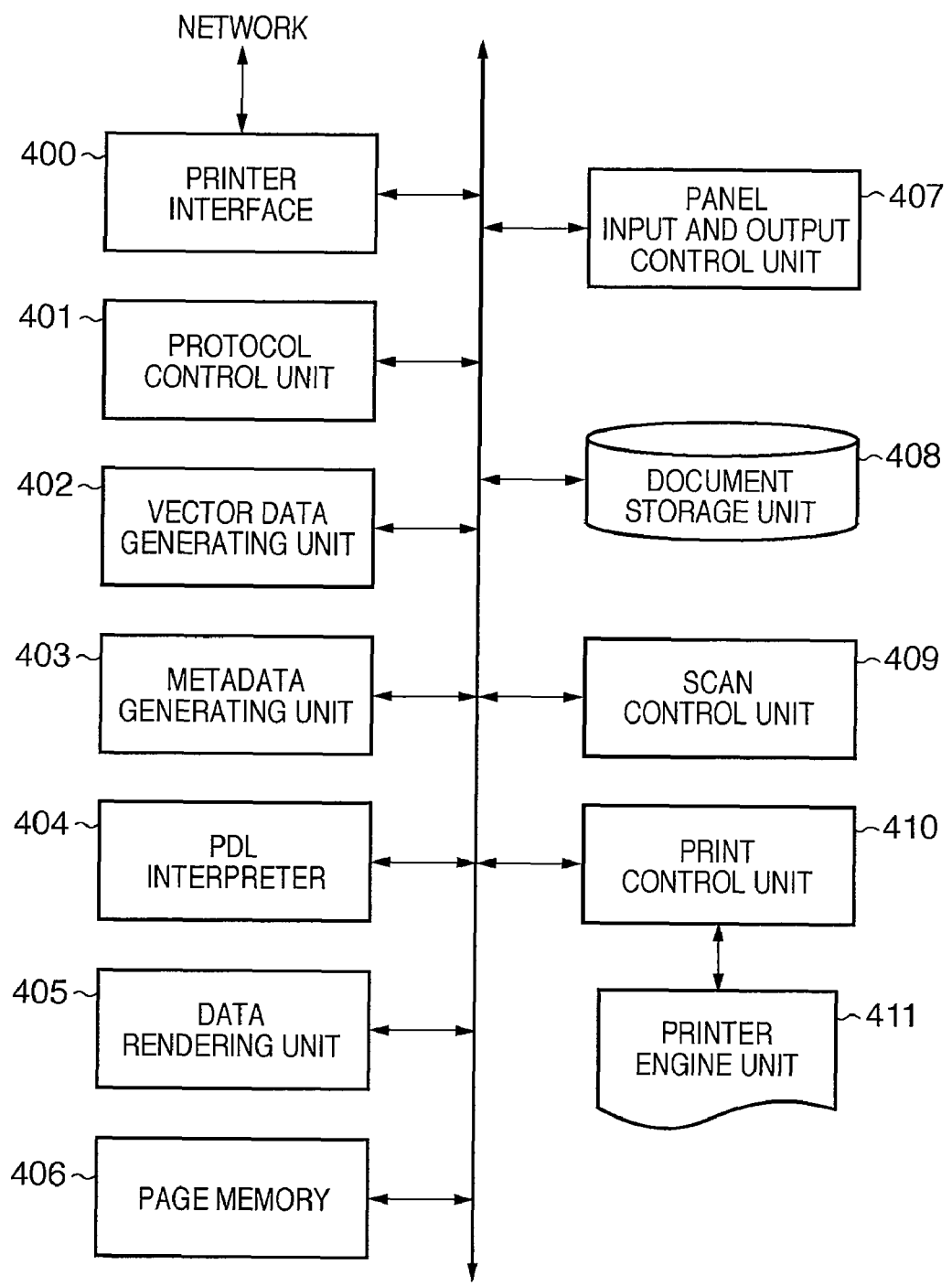
FIG. 4 is a block diagram showing a configuration of software mounted on the MFP.

FIG. 4 is a block diagram showing a configuration of software mounted on the MFP. The software shown in the configuration of FIG. 4 functions as controller software that controls operations of the MFP. In addition, the controller software is stored in, for example, the HDD 308, and operates the respective function blocks described with reference to FIG. 3 to realize the functions of the MFP. A printer interface 400 is an interface for communicating with the outside via the network. The protocol control unit 401 analyzes the protocol used in network communication and enables the MFP 1 to communicate with the outside. A vector data generating unit 402 generates vector data (hereinafter also referred to as vectorize) that is a resolution-independent rendering description from a bitmap image. A metadata generating unit 403 generates secondary information obtained through vectorization as metadata. In the present embodiment, generated metadata is used in subsequent steps not for rendering but as additional data for searching files and the like. A PDL interpreter 404 analyzes a PDL code and converts the same into an intermediate code readily processed by hardware or, in other words, an aforementioned display list. The intermediate code generated at the PDL interpreter 404 is supplied to a data rendering unit 405. The data rendering unit 405 renders the intermediate code supplied from the renderer into bitmap data, whereby the rendered bitmap data is successively stored in a page memory 406 that is a volatile memory. A panel input and output control unit 407 controls input/output operations by the user performed on an operating panel included in the operating unit 310. A document storage unit 408 is realized by a secondary storage such as a hard disk, and with respect to inputted image data, stores a data file including vector data, a display list and metadata for each job unit. In the present embodiment, such a data file shall be referred to as a document. A scan control unit 409 performs processing such as correction, data processing, and editing on image data inputted from the scanner 301. A print control unit 410 converts contents of the page memory 406 into a video signal and transfers the same to a printer engine unit 411. The printer engine unit 411 is a print mechanism unit which forms an image on recording paper based on the transferred video signal.

Figure 5:
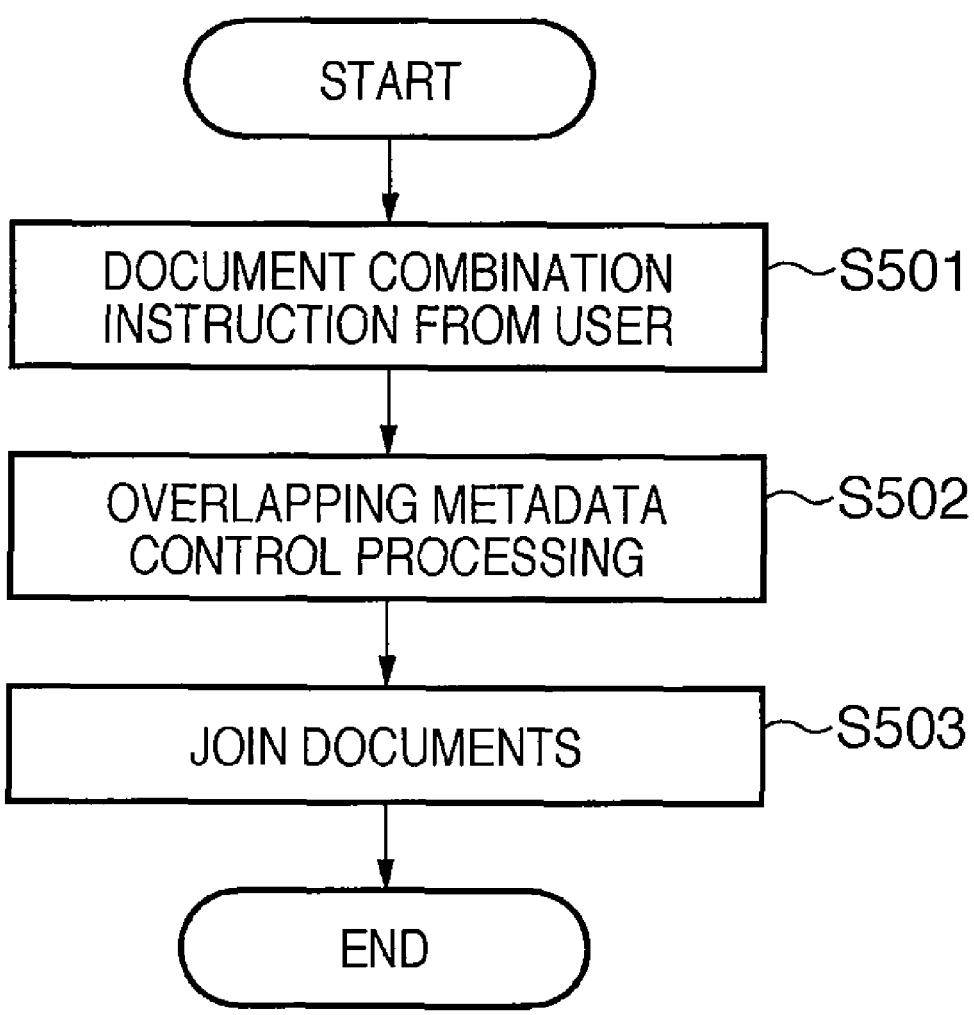
FIG. 5 is a flowchart showing procedures of processing performed by an image processing apparatus during document combination according to the present embodiment.

FIG. 5 is a flowchart showing procedures of processing performed by the image processing apparatus during document combination according to the present embodiment. Remote copying refers to, for example, processing in which a scan operation and a print operation among a conventional copy operation are respectively performed by different network devices, such as having the MFP 2 print/output an original image read at the MFP 1. On the other hand, processing in which operations from scanning to printing are performed at the same apparatus is referred to as local copying. For example, in a case where a printing function of an MFP is used to perform print processing of another job and therefore unable to handle local copying, by using a remote copying function, it is possible to have a different network device alternatively perform the print operation. In addition, in a case where a copy output is to be distributed to a user at a remote location, using a remote copying function and printing/outputting a copy to an apparatus installed near the user can save man-hours that would otherwise be required for distribution. In the present embodiment, the MFP to perform a scanning operation shall be referred to as a local MFP and the MFP to perform printing/outputting shall be referred to as a remote MFP. Furthermore, in FIG. 5, remote copying is executed, a document is stored in a storage device of the remote MFP, and the user performs processing such as combination and search on the stored document.

The flowchart shown in FIG. 5 is executed by the CPU 305 of the control unit 300 of the local MFP. The flowchart may also be arranged to be executed by any of the function blocks shown in the control unit 300 and which is under the control of the CPU 305. First, in step S501, document (file) combination is instructed by the user. In step S502, control is performed on overlapping metadata in regards to files stored in the storage device of the remote MFP for which the combination instruction had been issued, whereby overlapping metadata is either deleted or set as data exempt from search target. Next, in step S503, documents (files) are combined and stored as a newly combined document (hereinafter also referred to as a combined file) in the storage device.

As described above, in the present embodiment, when an instruction for document combination is issued by the user, processing is performed so that search object (search target) metadata does not overlap. As a result, the speed of searches for files in a storage device or the like can be increased. Details thereof will now be described.

Figure 6:
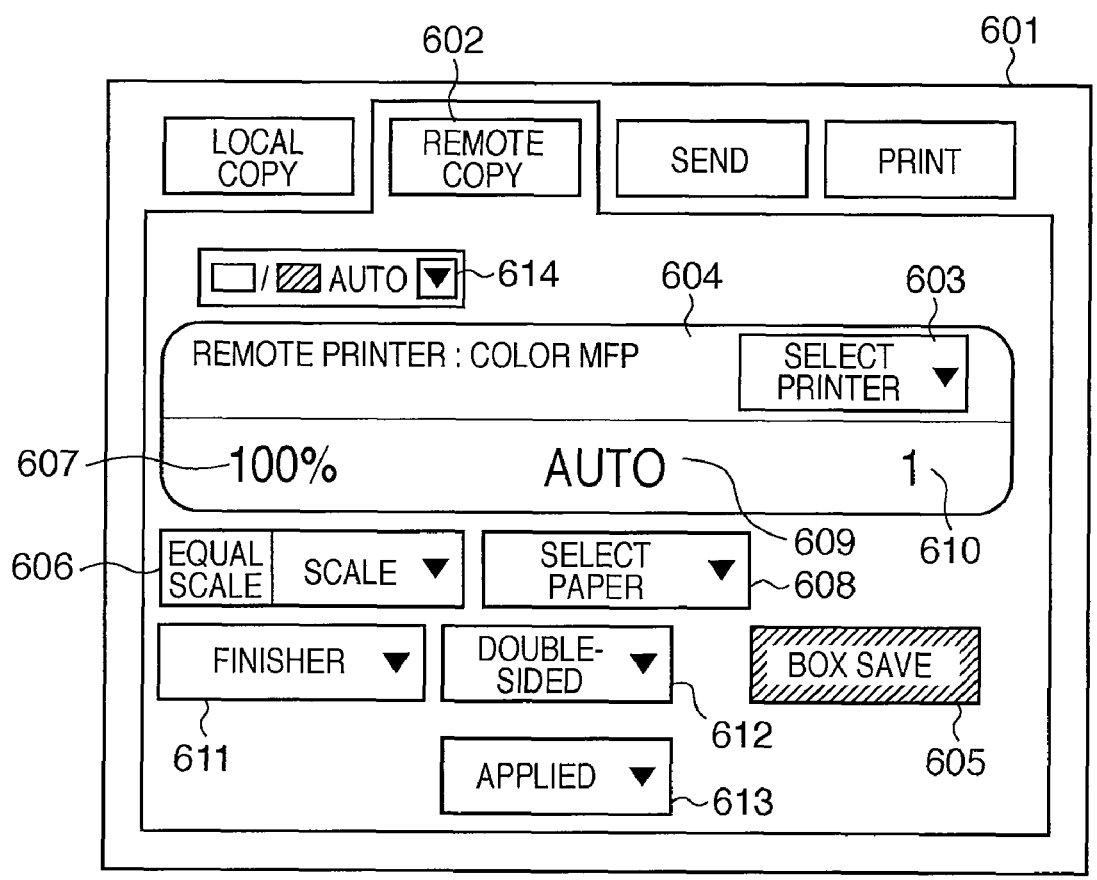
FIG. 6 is a diagram showing an example of a screen displayed on an operating unit of a local MFP when a user instructs remote copying.

FIG. 6 is a diagram showing an example of a screen displayed on the operating unit of the local MFP when a user instructs remote copying. A screen 601 is a screen displayed on the operating unit for setting and starting remote copying, and is displayed when the user presses down on a remote copying mode button 602.

When the user presses down on a printer selection button 603, a pull-down list of remote devices specifiable as remote copy output destinations is displayed (not shown) and the user is able to select a desired remote device. The name of the selected remote device is displayed in a display 604. A list of remote devices specifiable as a remote copy output destination may be retained in advance in the apparatus. In addition, the list may be arranged to be acquired from a network-connected server or the like which manages a list of specifiable remote devices. Alternatively, a packet for searching devices capable of receiving a remote copy may be broadcasted over the network, in which case a list of responding devices may be compiled.

A button 605 is a save-in-box selection button for selecting whether a remote copy is to be saved in a box (storage unit) of a remote device when executing remote copying. In the present embodiment, the save-in-box selection button is arranged as a toggle control where a selected state is achieved by pressing down the button and a selection-disabled state is achieved by once again pressing down the button.

A magnification specification button 606 enables a scaling magnification to be specified during remote copying. When the magnification specification button 606 is pressed down, a magnification specification screen, not shown, is displayed which allows the user to specify a scaling magnification on-screen. In addition, by pressing down on "same size" of the magnification specification button 606, a scaling magnification of 100% may be specified without having to display the magnification specification screen. The scaling magnification specified by the user is displayed in a display area 607.

A paper selection button 608 enables selection of paper on which printing/outputting is to be performed. When the user presses down on the paper selection button 608, a list of paper sizes selectable during printing/outputting is displayed. A paper size selected as the paper on which printing/outputting is to be performed is displayed in a display area 609. In the present embodiment, "AUTO" has been selected. Consequently, the size of an original is detected when scanning the same, and an optimum output paper is automatically selected in consideration of the scaling magnification specified by the user.

The number of copies to be made during remote copying is displayed in a display area 610. The user can set the number of copies by operating hard keys, not shown. Finisher settings may be specified by operating a finishing setting button 611. By pressing down on the finishing setting button 611, a finisher setting screen, not shown, is displayed which enables settings to be specified regarding various types of finishing performed on the printed paper such as sort, stable, hole punching and the like.

A duplex specification button 612 allows duplex (double-sided) copying to be specified. When the duplex specification button 612 is pressed down, a duplex setting screen, not shown, is displayed and settings such as duplex, 1-side, and binding direction during the duplex setting can be specified. Advanced (Applied) function settings can be specified using an advance function setting button 613. Pressing down on the advanced function setting button 613 enables setting advanced functions of the MFP such as page continuous copying, book binding, reduced-scale layout setting, or the like. Color mode settings may be specified by operating a color mode setting button 614. By pressing down on the color mode setting button 614, a list including "color copy", "black-and-white copy", and "AUTO" is displayed, whereby the user can select a desired item. When "color copy" and "black-and-white copy" is selected, printing/outputting is respectively performed in the selected mode. On the other hand, in the event that "AUTO" is selected, a judgment is automatically made when an original is scanned on whether the original is a color original or a black-and-white original, whereby color copying is executed in the case of a color original and black-and-white copying is executed in the case of a black-and-white original.

Figure 7:
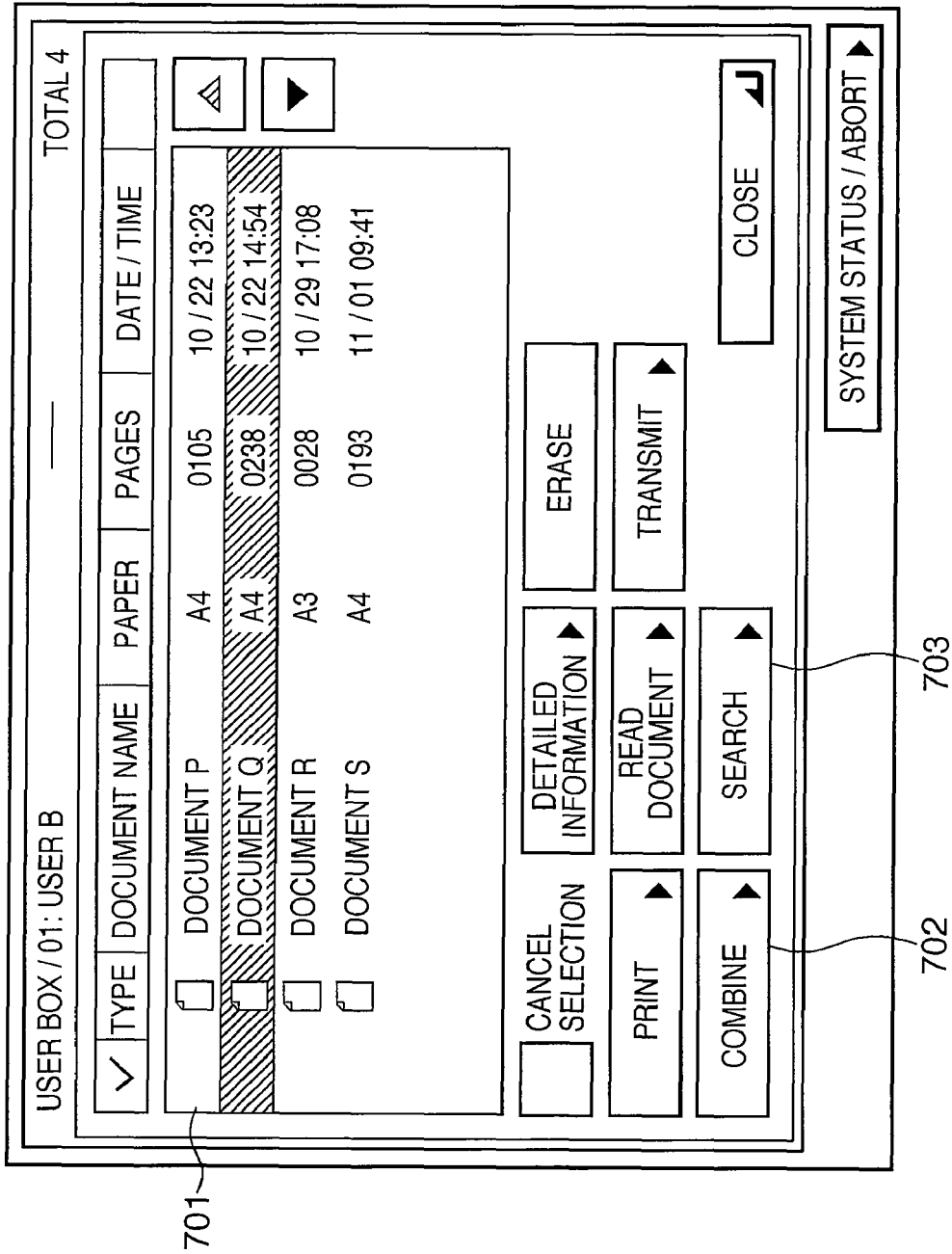
FIG. 7 is a diagram showing an example of a screen displayed in a display unit of the operating unit when a user instructs combination of files stored in a secondary storage of an image output apparatus.

FIG. 7 is a diagram showing an example of a screen displayed in a display unit of the operating unit when a user instructs combination of files stored in a secondary storage (hereinafter also referred to as a box) of an image output apparatus. A display 701 shown in FIG. 7 displays a list of files saved in a box. A button 702 is a combination button. When the user selects a plurality of files on the display 701 and presses down on the button 702, the selected files are combined. A button 703 is a search button. When the user wishes to search for a file, a screen, not shown, for inputting a desired character string is displayed by pressing down on the button 703. Consequently, a search is performed on metadata of files in the box using the inputted desired character string and a search result is displayed on the display 701.

Next, a description will be given on processing in which is configured a document including vector data, a display list, and metadata, according to the present embodiment.

Figure 8:
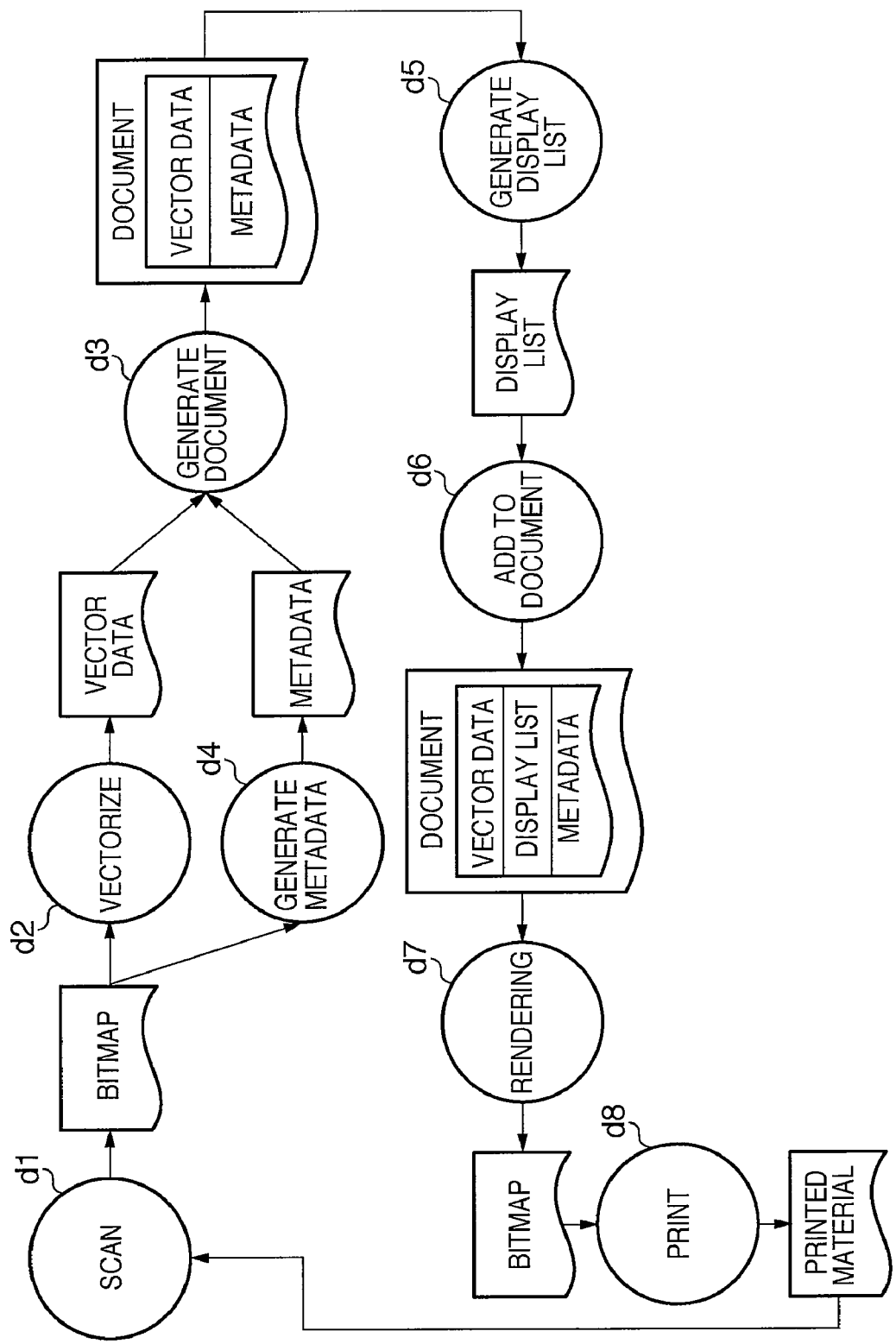
FIG. 8 is a diagram showing an overall outline of procedures for generating a document during a scan operation.

FIG. 8 is a diagram showing an overall outline of procedures for generating a document during a scan operation. A paper original placed on the scanner unit 11 is converted into bitmap data in scan processing d1. Next, in vectorization processing d2 and metadata generation processing d4, vector data that is resolution-independent and metadata are generated from the bitmap data. In other words, for example, an image processing apparatus that is a local MFP includes resolution-independent data generating means for generating vector data that is resolution-independent data, and additional information data generating means for generating metadata that is additional information data.

Next, in document generation processing d3, a document to which are associated the vector data and the metadata is generated. In display list generation processing d5, a display list is generated from vector data included in the document. In other words, for example, an image processing apparatus that is a local MFP includes resolution-dependent data generating means for generating display lists that are resolution-dependent. The generated display list is stored in the document and, at the same time, rendered into bitmap data in render processing d7. The rendered bitmap data is recorded on a paper medium and becomes printed material in print processing d8.

At this point, by once more placing the outputted printed material on the scanner unit 11, processing starting from the scan processing d1 can be repeated.

Figure 9:
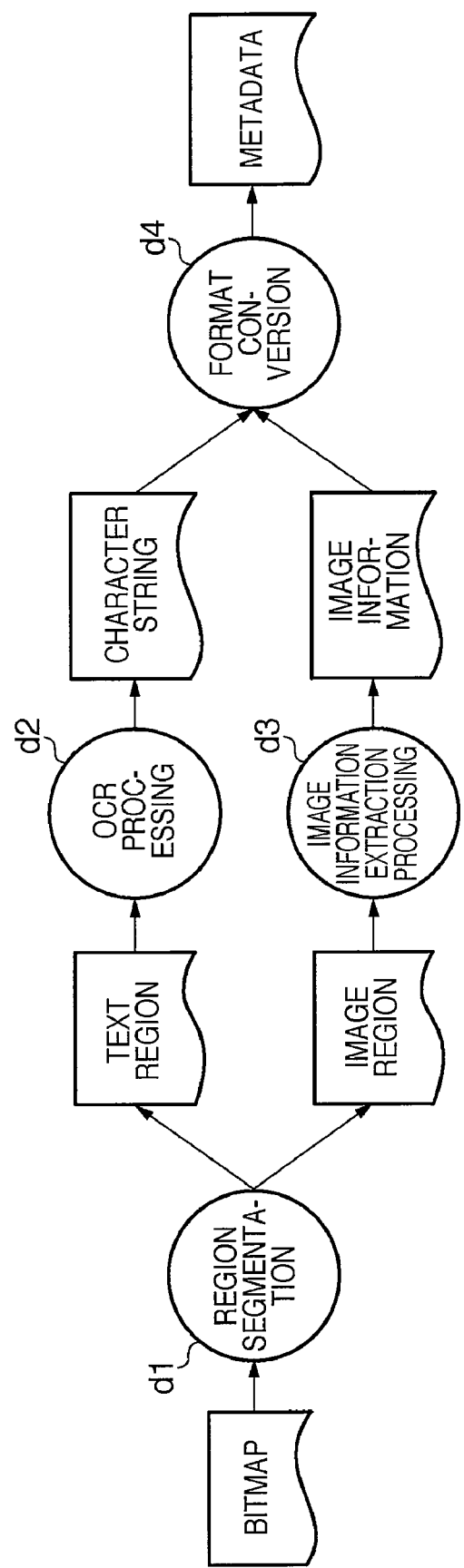
FIG. 9 is a diagram showing a flow of procedures of metadata generation processing depicted in FIG. 8.

FIG. 9 is a diagram showing a flow of procedures of the metadata generation processing d4 depicted in FIG. 8. As shown in FIG. 9, region segmentation from the bitmap data is performed in region segmentation processing d1. In this case, region segmentation refers to processing for analyzing inputted bitmap image data, splitting the data into regions for each object contained in the image data, and judging and classifying attributes of the respective regions. Attributes may include, for example, "TEXT", "PHOTO", "LINE", "PICTURE", and "TABLE".

Figure 10:
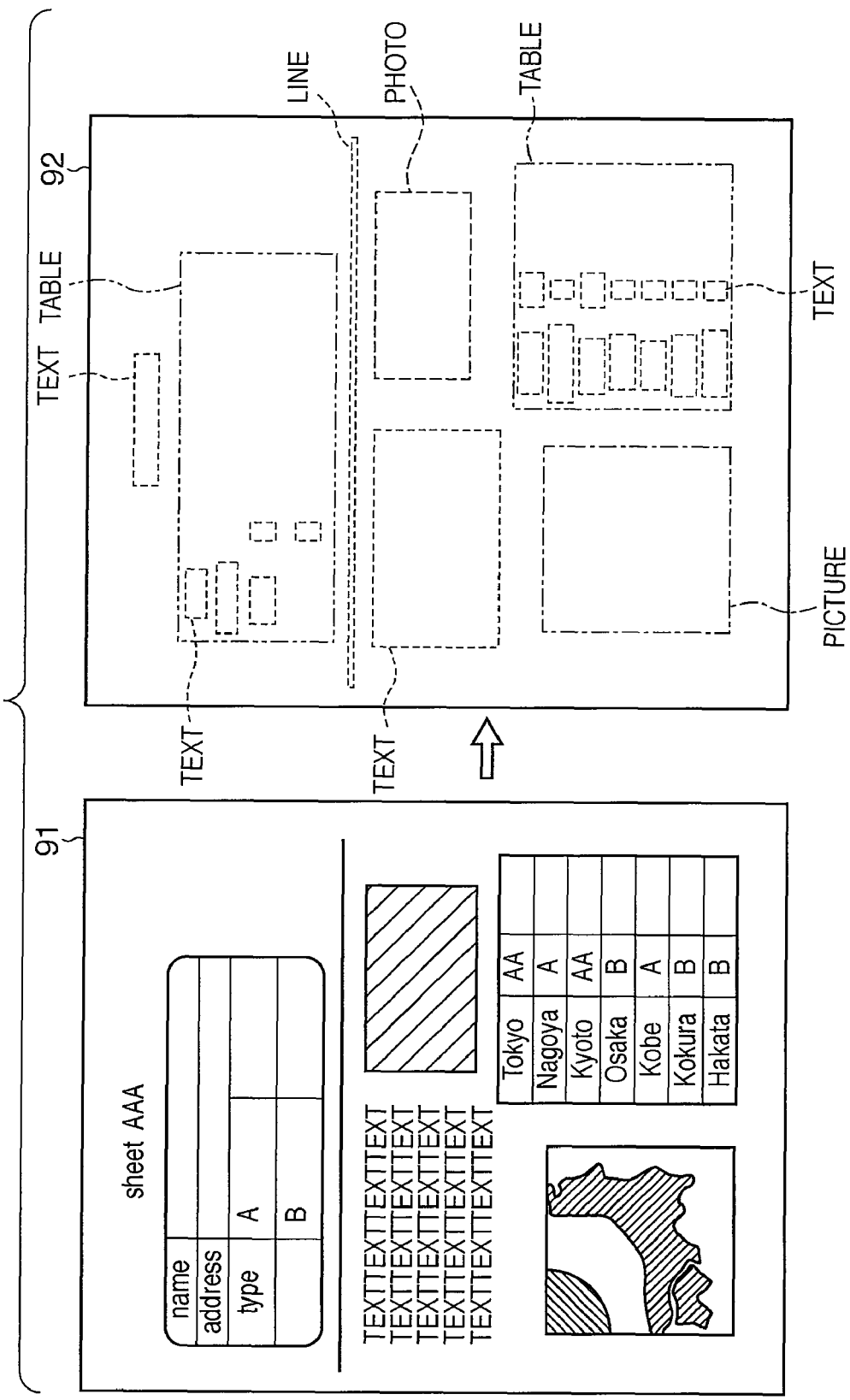
FIG. 10 is a diagram showing an example of a case where region segmentation is performed on an input image.

An example of region segmentation will now be described. FIG. 10 is a diagram showing an example of a case where region segmentation is performed on an input image. A result of region segmentation performed on an input image 91 is shown as judgment result 92. The portion enclosed by a dotted line in the judgment result 92 represents a single object unit generated as a result of the analysis of the image. In addition, the type of an attribute affixed to each object unit represents the judgment result of region segmentation.

Among regions classified according to attributes, a region represented by a text attribute is subjected to character recognition in OCR processing d2 and converted into a character string. That is, the converted character string is the character string printed on the paper. In addition, among regions classified according to attribute, a region represented by an image attribute is converted into image information in image information extraction processing d8. In this case, image information refers to a character string describing characteristics of the image such as "flower" or "face". For extracting image information, generally-known image processing techniques including image characteristic detection in which image characteristics such as a frequency of pixels constituting the screen and facial recognition can be used. The generated character string and image information is adjusted to a data format described later in format conversion processing d4 to generate metadata.

Figure 11:
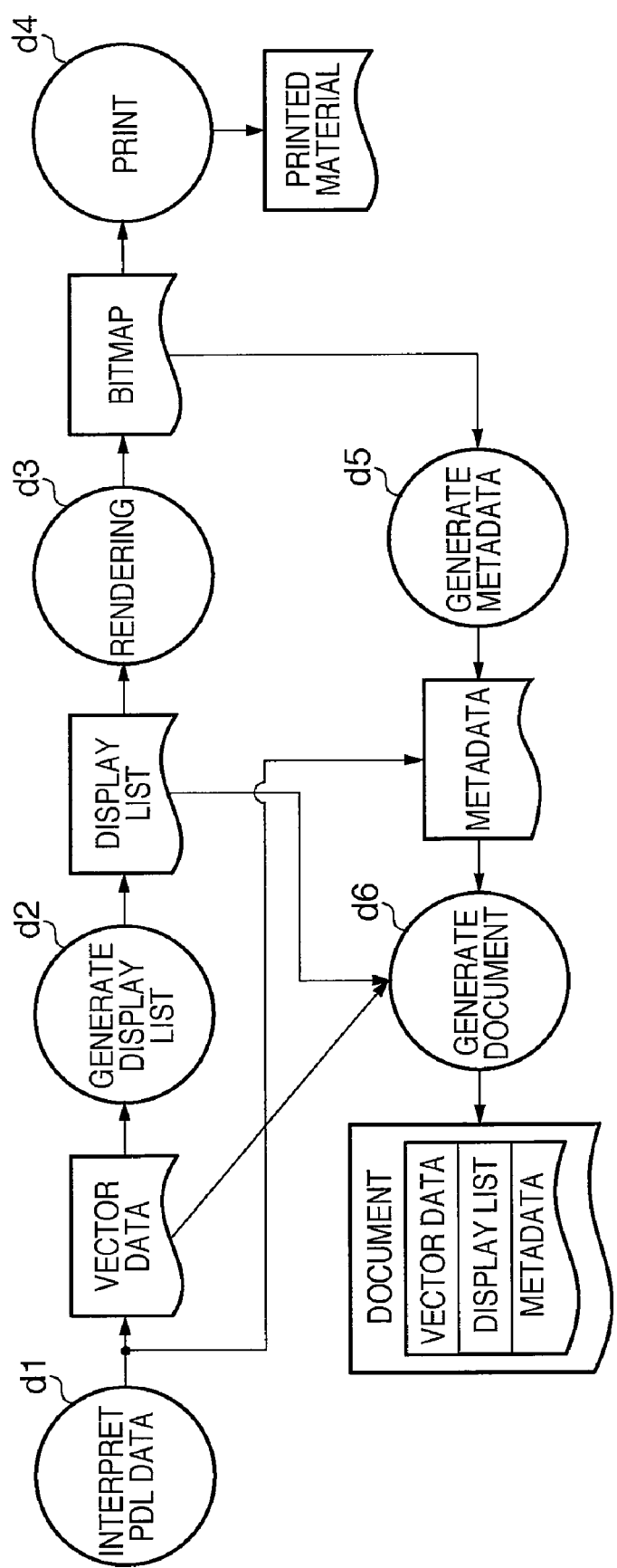
FIG. 11 is a diagram showing an overall outline of procedures for generating a document during PDL printing.

FIG. 11 is a diagram showing an overall outline of procedures for generating a document during PDL printing. PDL printing refers to a printer operation in which output is performed based on a page description language generated by a printer driver when printing is instructed via application software mounted on a general-purpose PC. In the present embodiment, for example, LIPS (LBP Image Processing System) (registered trademark) or PS (Post Script) (registered trademark) is used as a PDL.

As shown in FIG. 11, received PDL data is interpreted in PDL data interpretation processing d1 and vector data is generated. Next, in display list generation processing d2, a display list is generated from vector data. The generated display list is transmitted to render processing d3 to be rendered into bitmap data. The rendered bitmap data is recorded on a paper medium and becomes printed material in print processing d4. In addition, as described with reference to FIG. 9, in metadata generation processing d5, a character string or image information is generated as metadata from the bitmap data generated in the render processing d3. In the flow shown in FIG. 11, the generated vector data, display list and metadata are stored in a document in document generation processing d6. When the PDL includes character string information in the event that metadata is generated in FIG. 11, metadata may be generated from character string information and stored in the document during PDL data interpretation.

Figure 12:
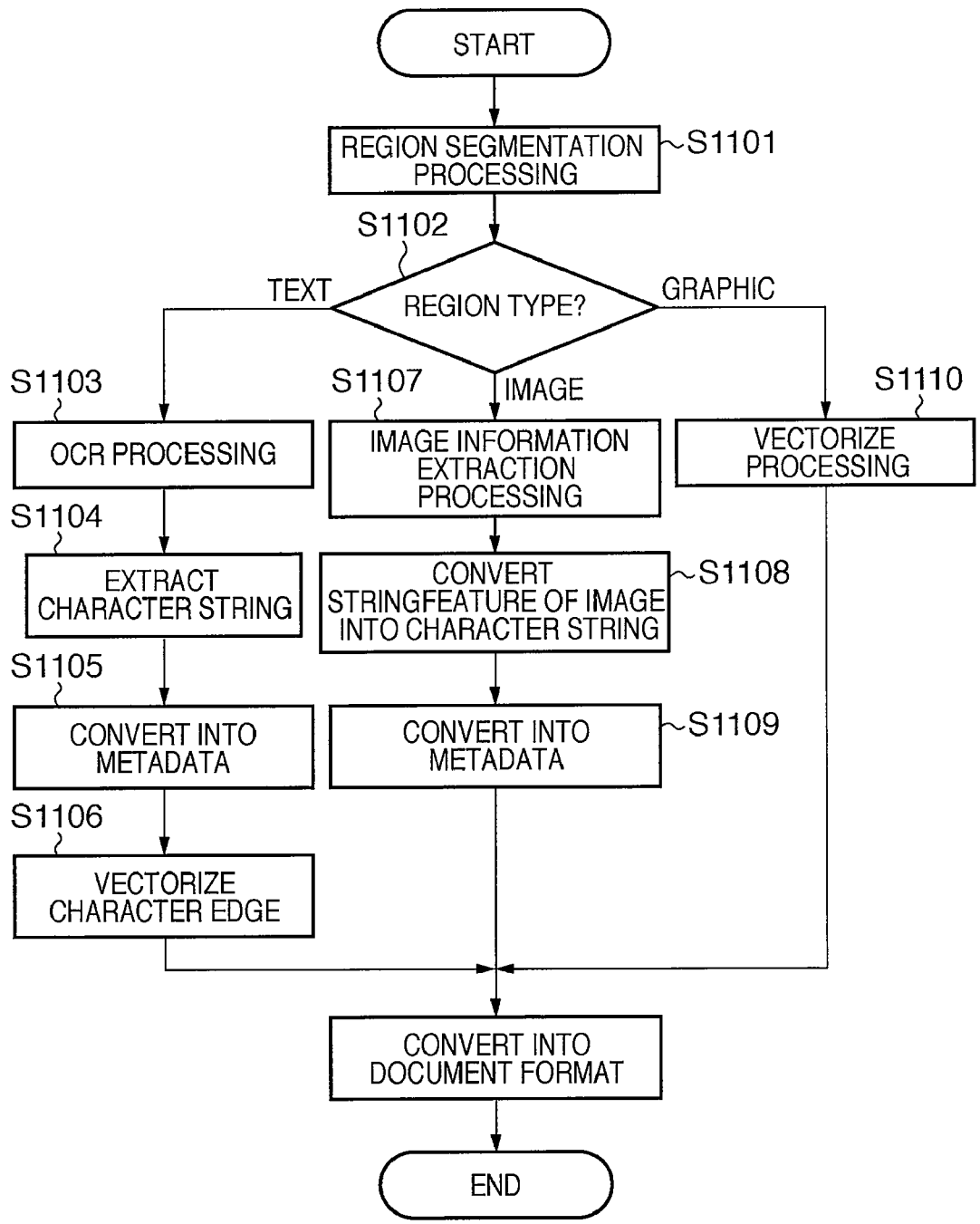
FIG. 12 is a diagram showing procedures in which vector data and metadata are generated for each segmented region type.

While procedures for generating vector data and metadata from bitmap data have been described with reference to FIGS. 8 and 9, in reality, there may be cases where respective processing are performed for each segmented region type of bitmap data. FIG. 12 is a diagram showing procedures in which vector data and metadata are generated for each segmented region type.

In step S1101, processing for region segmentation similar to that described with reference to FIG. 9 is performed. In step S1102, types of regions, i.e., attributes, are classified into "TEXT", "GRAPHIC" and "IMAGE". For example, among the attributes classified in FIG. 10, "PHOTO" and "PICTURE" are classified into "IMAGE" while "LINE" and "TABLE" are classified into "GRAPHIC". In step S1102, when the region attribute is "TEXT", the procedure proceeds to step S1103 in which OCR processing is performed, and in step S1104, a character string is extracted. Furthermore, in step S1105, the character string is converted into metadata, and in step S1106, character edges are converted into vector data. The metadata converted from the character string is a sequence of character codes which, in the present embodiment, is used for performing a keyword search of files. However, although the OCR processing performed in step S1103 is capable of recognizing character codes, the OCR processing is unable to recognize font types such as Mincho or Gothic, character sizes such as 10 pts, character decorations such as italics or bold type, and the like. Nevertheless, in the present embodiment, since character edges are converted into vector data in step S1106, necessary information may be included during rendering.

In addition, when the region attribute is "IMAGE" in step S1102, the procedure proceeds to step S1107 to perform image information extraction processing. In step S1107, in the same manner as in the description with reference to FIG. 9, characteristics of an image are extracted using a generally-known image processing technique such as image characteristic amount detection or face recognition. Next, proceeding to step S1108, the image characteristics (feature of image) detected in step S1107 are converted into a character string. At this point, for example, the MFP 1 may be arranged to retain, in advance, a correspondence table between parameters representing characteristics and character strings in the HDD 308 or the like. Next, in step S1109, the character string is converted into metadata. Furthermore, when the region attribute is "IMAGE", the image data is retained without modification as vector data. Moreover, in step S1102, when the region attribute is "GRAPHIC", the procedure proceeds to step S1110 to perform vectorization processing.

In the present embodiment, a document including vector data, a display list and metadata is generated, whereby the document is printed by remote copying. A procedure for printing a document according to the present embodiment will now be described.

Figure 13:
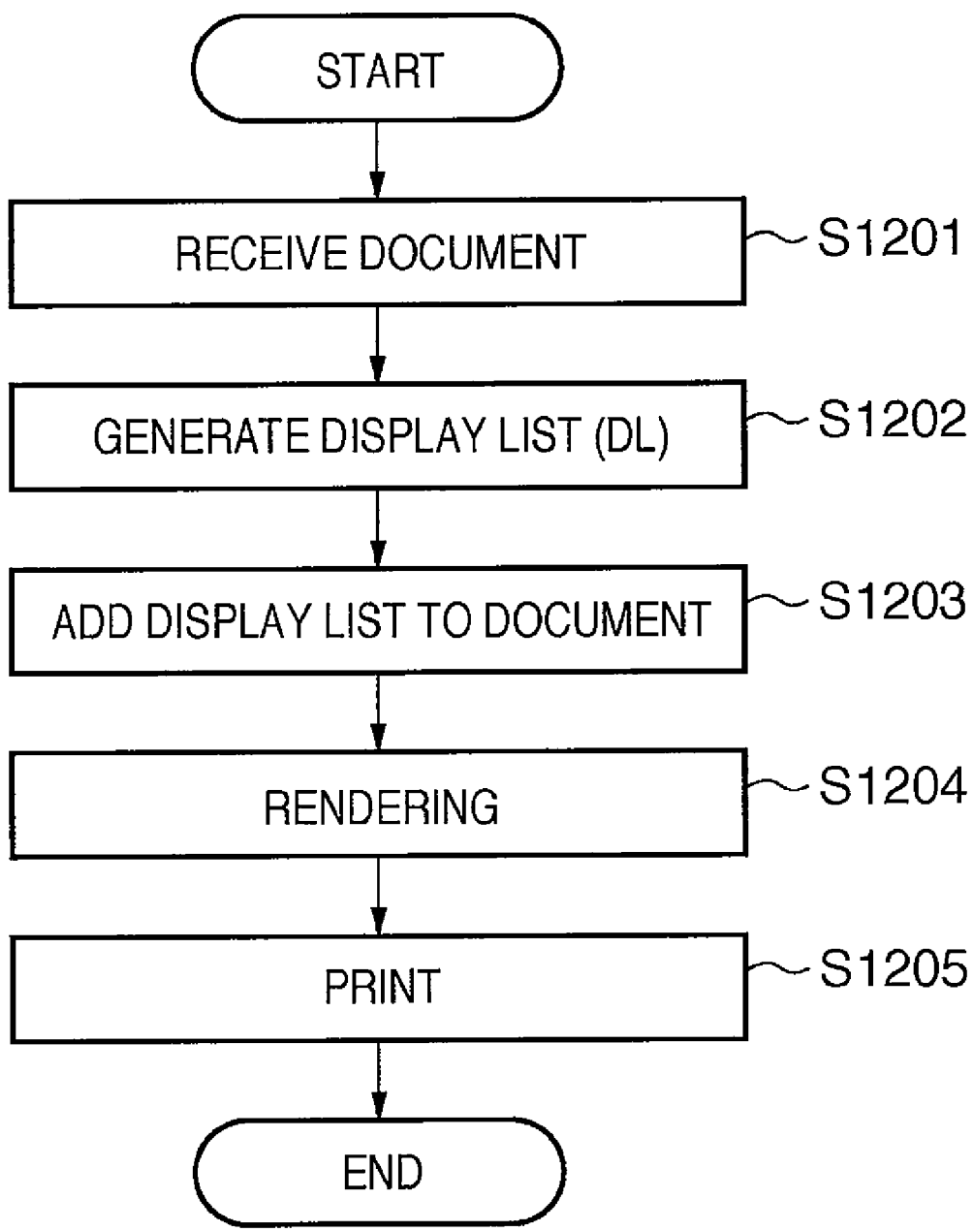
FIG. 13 is a flowchart showing procedures of processing for printing a generated document.

FIG. 13 is a flowchart showing procedures of processing for printing a generated document. However, it should be noted that FIG. 13 does not show a step in which data is transmitted from a local MFP to a remote MFP.

In step S1201, a print control unit 410 receives the document generated from bitmap data (the document generation processing d3 shown in FIG. 8), and in step S1202, a display list is generated from vector data included in the document. Next, in step S1203, the generated display list is added to the document. In step S1204, the display list is extracted from the document and rendered into bitmap data. Finally, in step S1205, print processing of the rendered data (outputted data) to a paper medium is performed.

Figure 14:
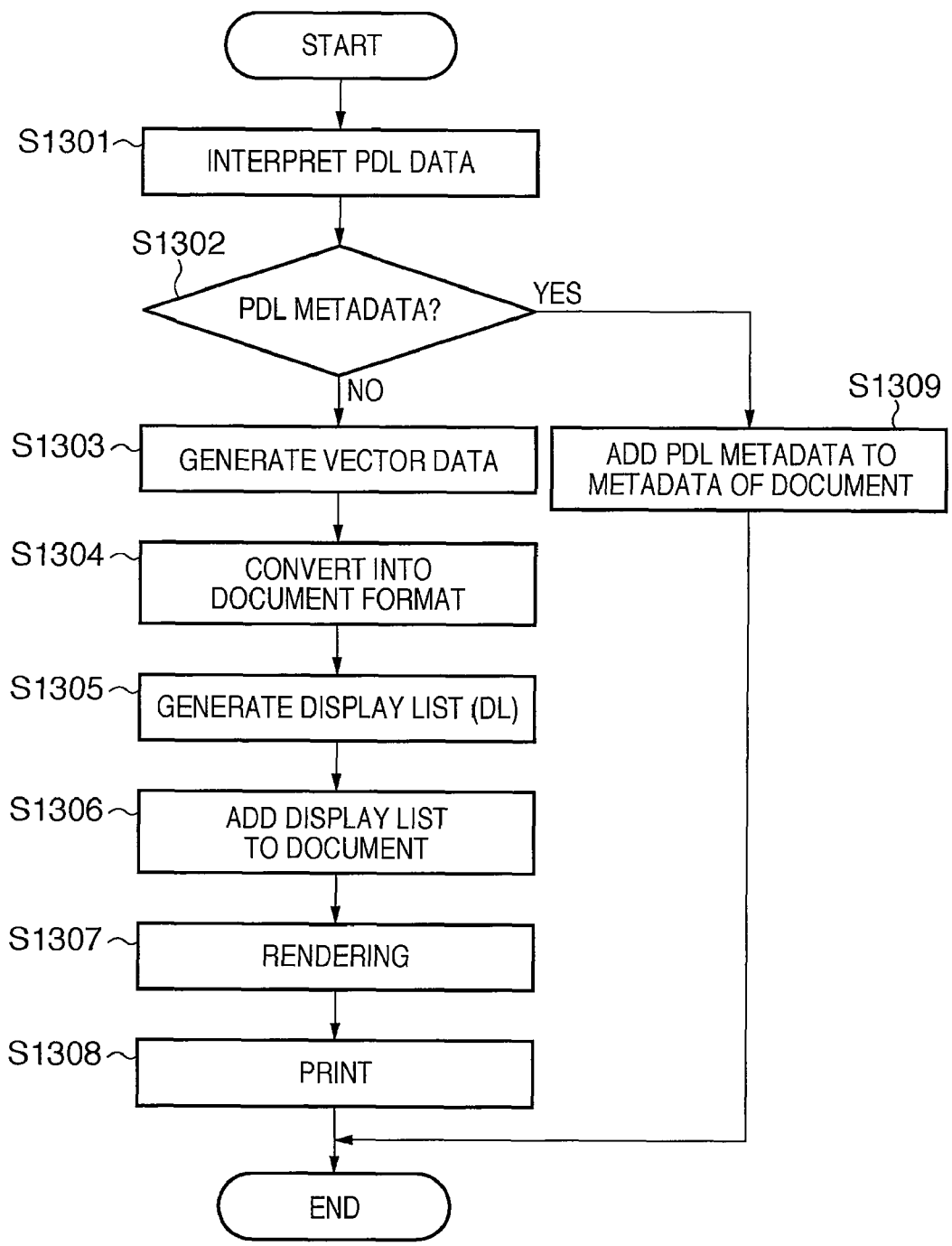
FIG. 14 is a flowchart showing procedures of print processing of a generated document during PDL printing.

FIG. 14 is a flowchart showing procedures of print processing for a generated document during PDL printing. However, in the same manner as in FIG. 13, FIG. 14 does not show a step in which data is transmitted from a local MFP to a remote MFP.

In step S1301, PDL data is interpreted. When metadata such as character string information is included, the metadata is added to a document in separate processing. In step S1303, data other than metadata is converted into vector data, and in step S1304, a document is generated. Next, in step S1305, a display list is generated from the vector data, and in step S1306, the generated display list is added to the document. In step S1307, the display list is extracted from the document and rendered into bitmap data. Finally, in step S1308, print processing of the rendered data (outputted data) to a paper medium is performed.

Next, formats of documents generated in the present embodiment will be described.

Figure 15:
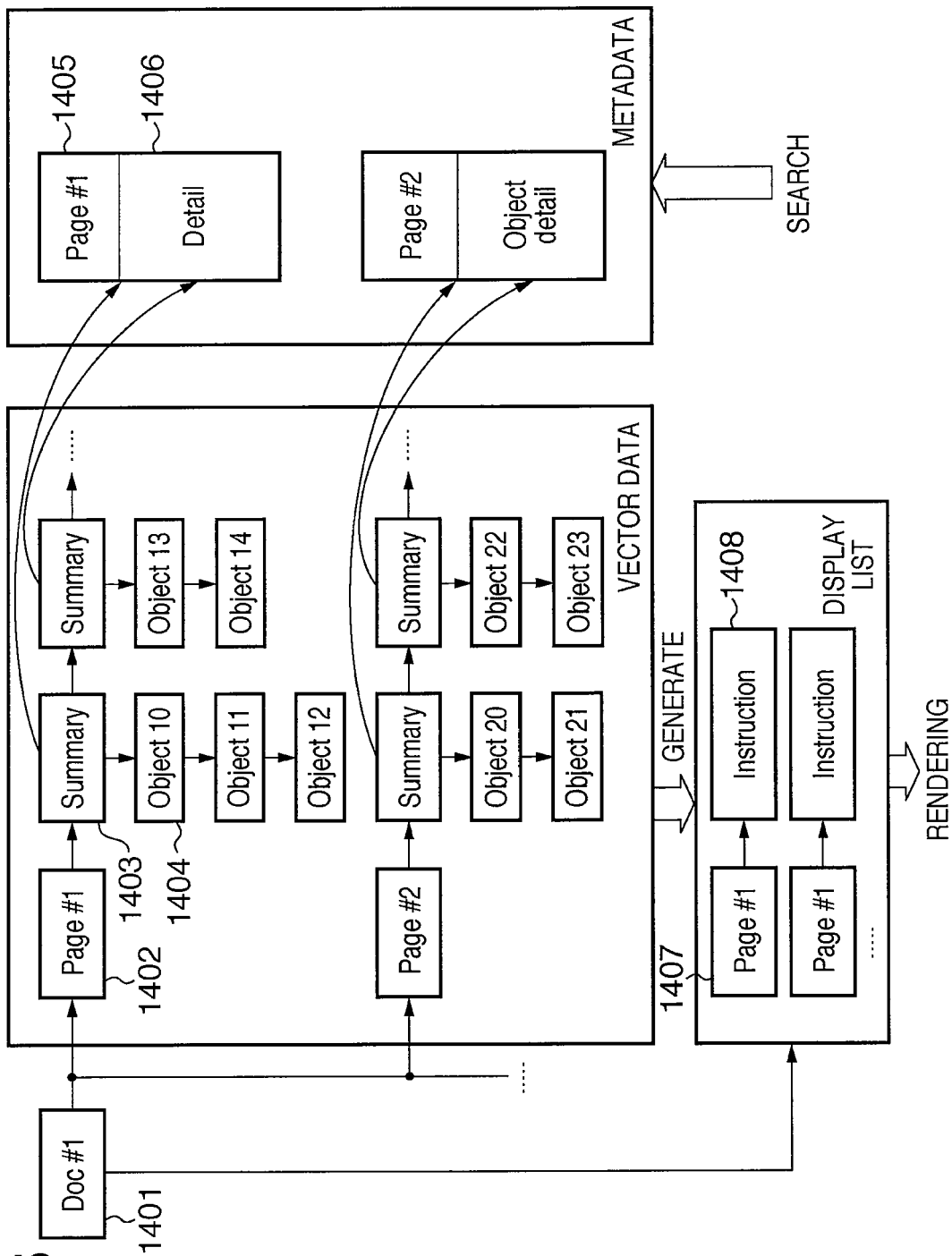
FIG. 15 is a diagram showing a data structure of a document.

FIG. 15 is a diagram showing a data structure of a document. As shown in FIG. 15, a document includes vector data, metadata and a display list which respectively contain a plurality of pages. In addition, as shown in FIG. 15, a document is given a hierarchical structure with a document header 1401 at the uppermost tier. The vector data and the display list respectively include page headers 1402 and 1407 and are positioned at a tier under the document header 1401. Since storage locations of the vector data and the display list in a memory or the like are described in the document header 1401, the vector data and the display list are associated with each other via the document header 1401. In the vector data, summaries 1403 are respectively provided under the plurality of page headers 1402. The vector data is rendering data that is independent to the resolution of the printer engine, and the page headers 1402 include descriptions of layout information such as paper size and paper direction. In addition, as shown in FIG. 15, while a plurality of summaries is associated to a page header 1402, objects 1404 are provided under the respective summaries. A single piece of rendering data such as a line, a polygon, and a Bezier curve is associated to each object 1404, and a plurality of objects is collectively associated to a summary 1403. A summary 1403 includes a description of information in which characteristics of a plurality of objects are compiled. For example, attribute information of segmented regions aforementioned with respect to FIG. 10 is described in a summary 1403.

The metadata shown in FIG. 15 is not involved in the render processing and is used as, for example, additional information for file search. As shown in FIG. 15, metadata includes a plurality of pieces of information respectively constituted by page information 1405 and detailed information 1406. In the present embodiment, page information 1405 includes, for example, a description of information on generation of metadata from bitmap data or PDL data, and detailed information 1406 includes, for example, a description of a character code string generated as OCR information or image information. In the present embodiment, the detailed information 1406 of page information 1405 corresponding to metadata can be referenced from the summary 1403 of vector data.

The display list shown in FIG. 15 refers to an intermediate code used when a renderer performs rendering into bitmap data. As shown in FIG. 15, a display list includes a page header 1407 and an instruction 1408 for rendering. In the present embodiment, a page header 1407 includes a description of a management table of rendering information (instruction) within the page or the like. The instruction 1408 includes instructions dependent on the resolution of the printer engine.

Figure 16:
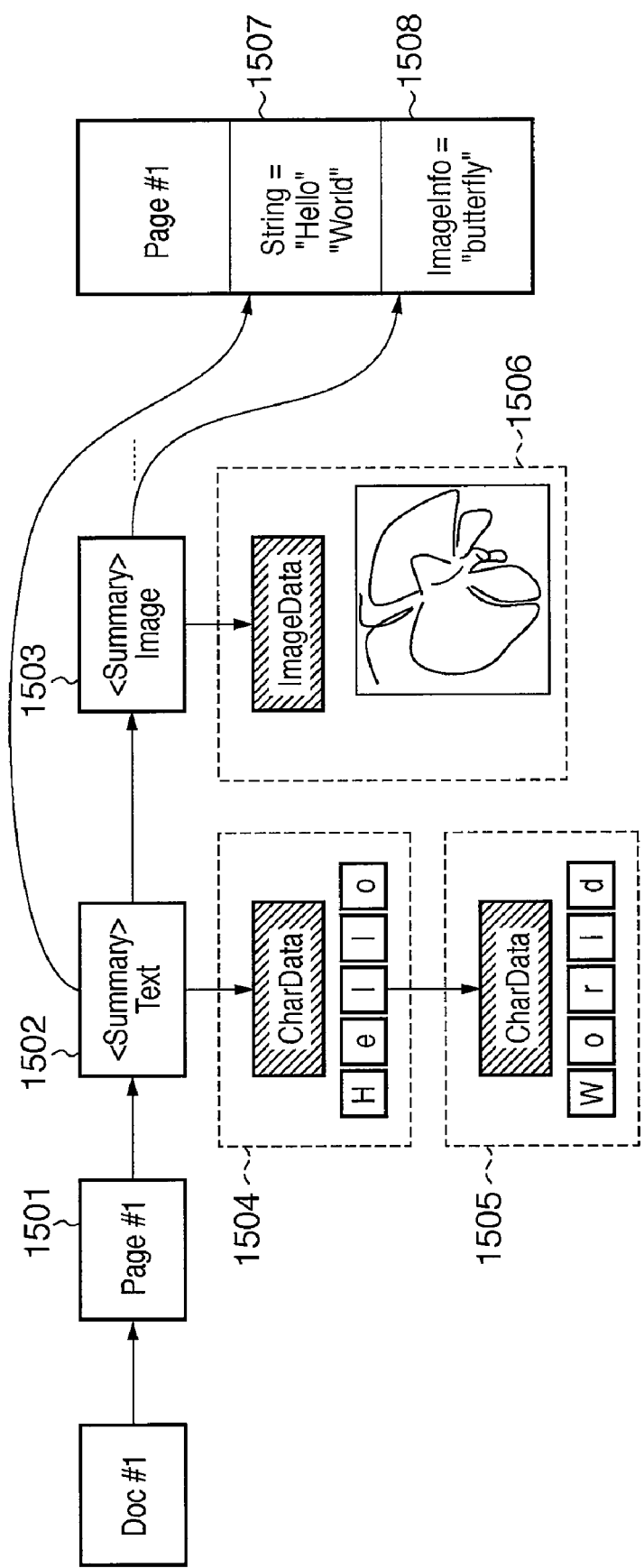
FIG. 16 is a diagram showing an example of a data structure of a document.

FIG. 16 is a diagram showing an example of a data structure of a document. As shown in FIG. 16, a page header 1501 indicating the first page includes a summary 1502 containing attribute information "TEXT" and a summary 1503 containing attribute information "IMAGE". Vector data representing character edges of each character in "Hello" is linked to an object 1504 associated with the summary 1502. In addition, vector data representing character edges of each character in "World" is linked to an object 1505. Furthermore, for example, a photographic image of a butterfly in JPEG format is linked to an object 1506 associated with the summary 1503. The summary 1502 references a character code string included in a region 1507 of metadata detailed information, while the summary 1503 references image information "butterfly" included in a region 1508 of metadata detailed information. In the present embodiment, for example, when text on a page is searched using a keyword "World", the region 1507 of metadata detailed information is referenced.

Figure 17A:
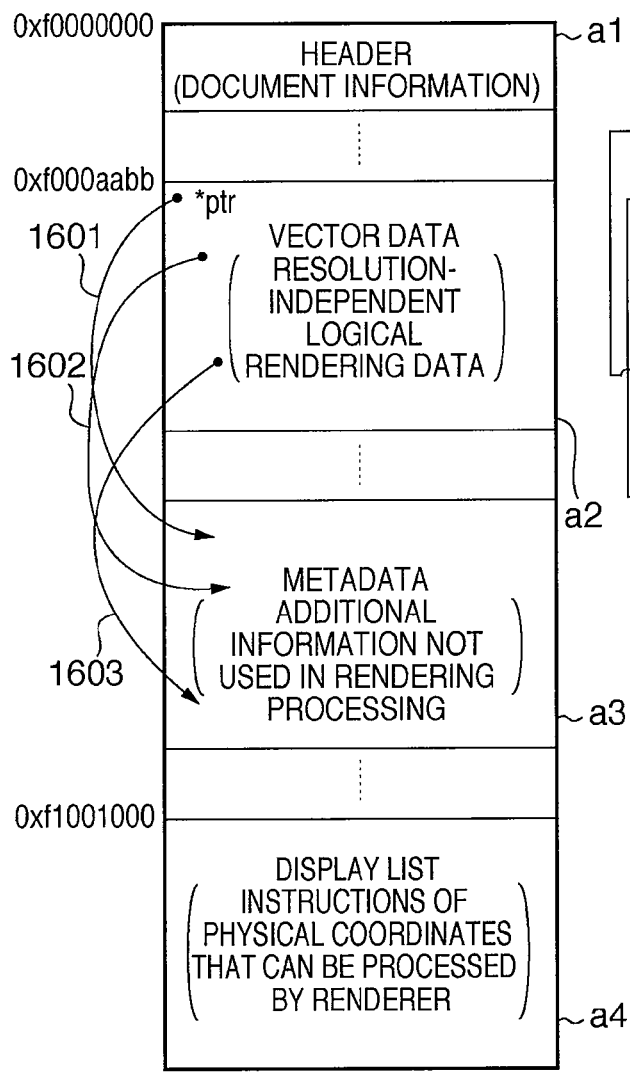
FIG. 17A shows an example in which the document shown in FIG. 15 is placed on a memory.
Figure 17B:
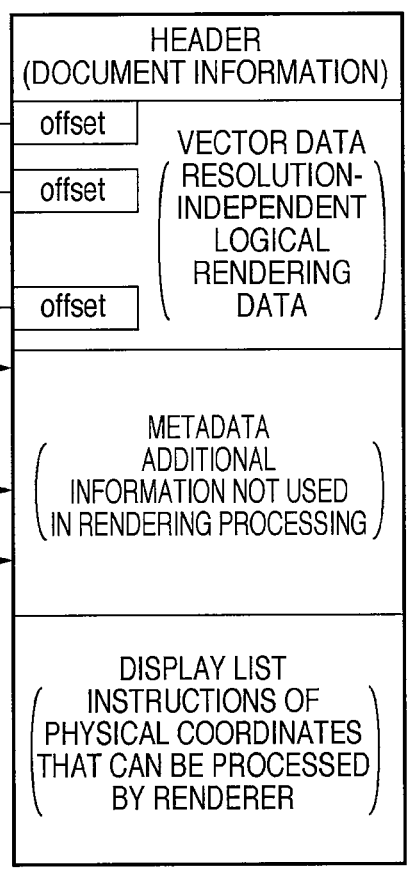
FIG. 17B shows an example in which the document shown in FIG. 15 is placed on a file.

FIGS. 17A and 17B show examples in which the document shown in FIG. 15 is placed on a memory or a file. FIG. 17A shows an example in which the document shown in FIG. 15 is allocated to an address on a memory. As shown in FIG. 17A, in a document, a vector data region, a metadata region and a display list region are allocated to arbitrary addresses on a memory. Arrow 1601, arrow 1602 and arrow 1603 denote that metadata is being referenced from vector data as was described with reference to FIG. 16. As shown in FIG. 17B, the vector data region, the metadata region and the display list region are serialized in a single file. In FIG. 17A, metadata is referred from vector data by a pointer, while in FIG. 17B, metadata is referred from vector data by offset information.

Figure 18:
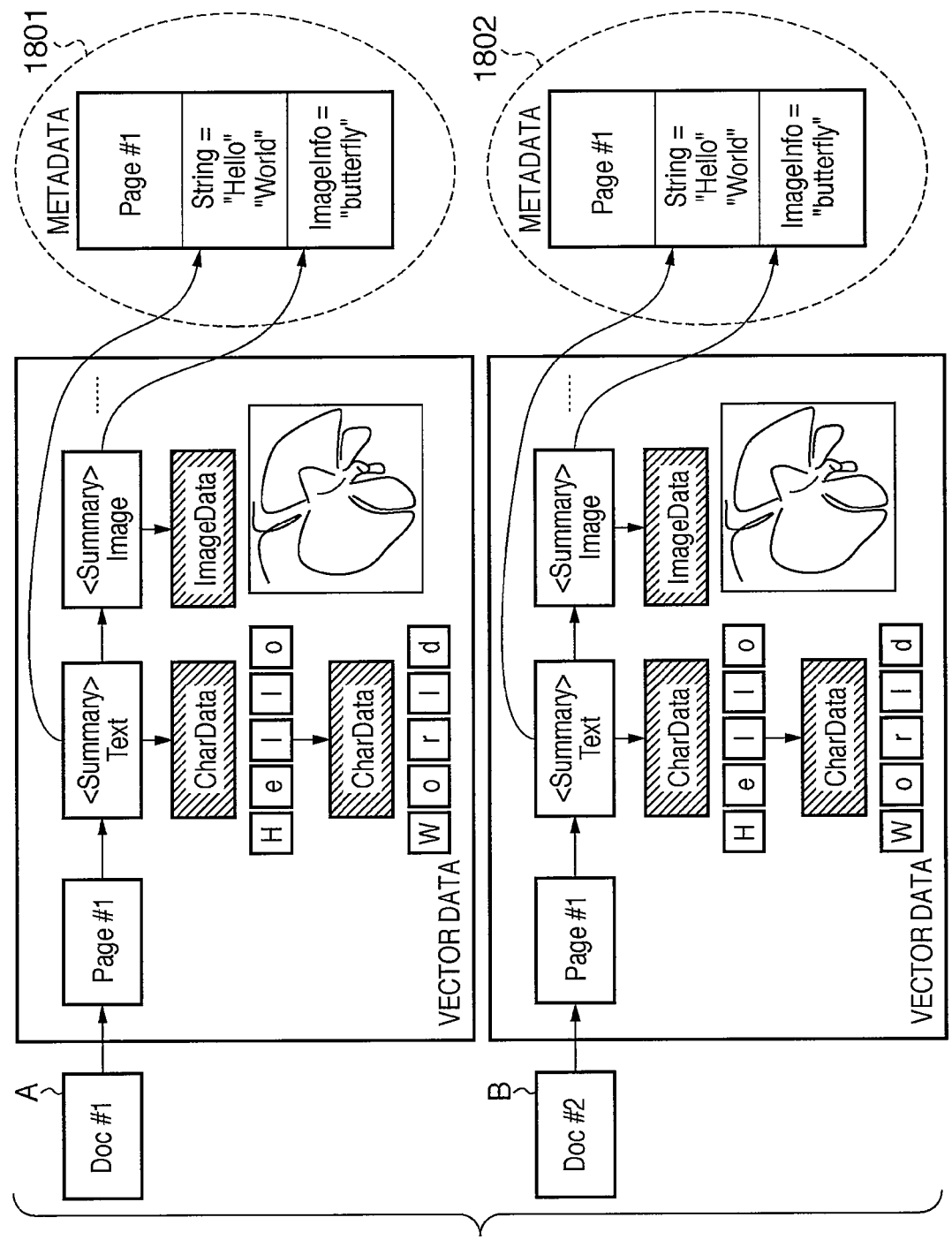
FIG. 18 is an explanatory diagram of control of overlapping metadata according to the present embodiment.
Figure 19:
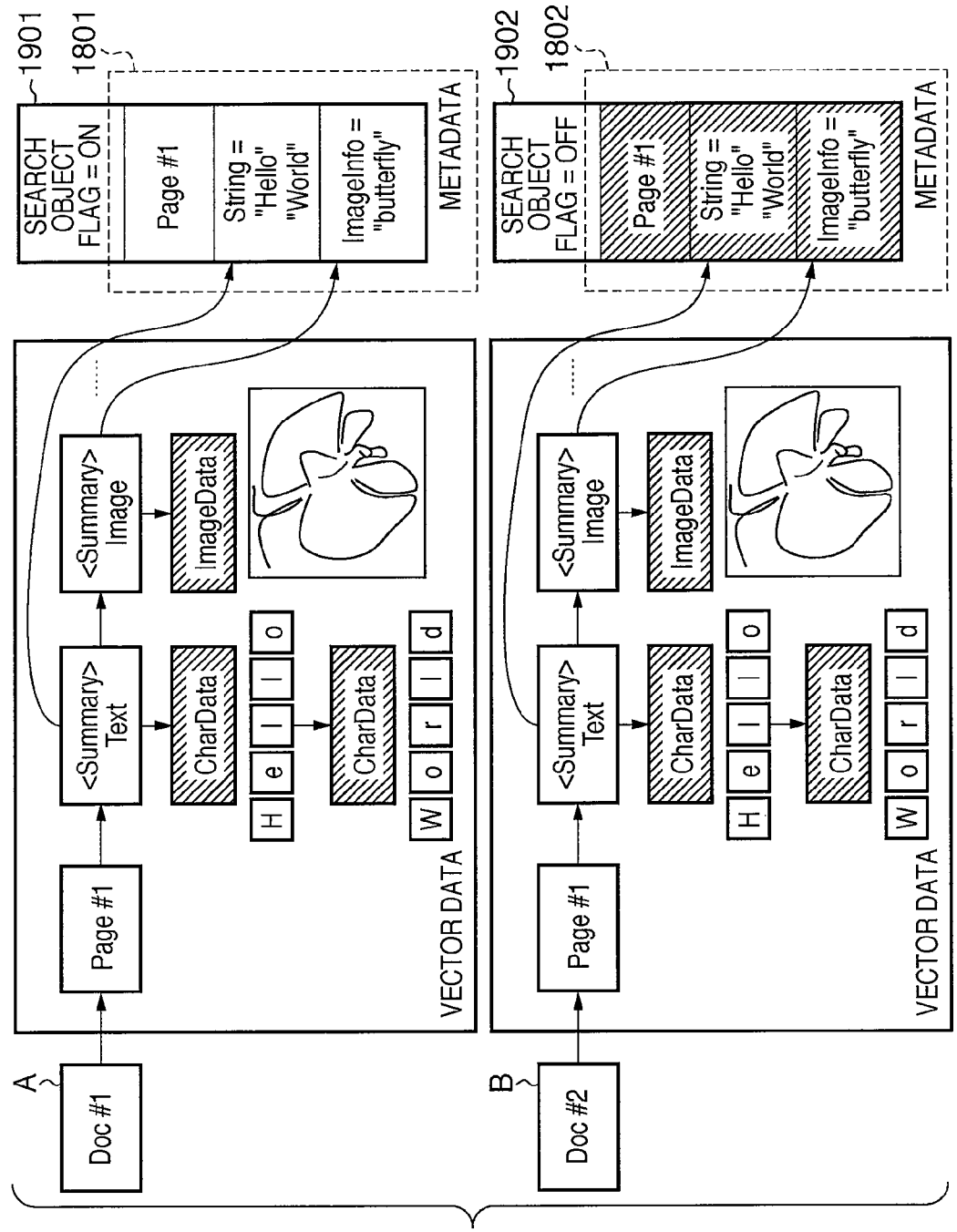
FIG. 19 is an explanatory diagram of a case where a search object flag is used according to the present embodiment.
Figure 20:
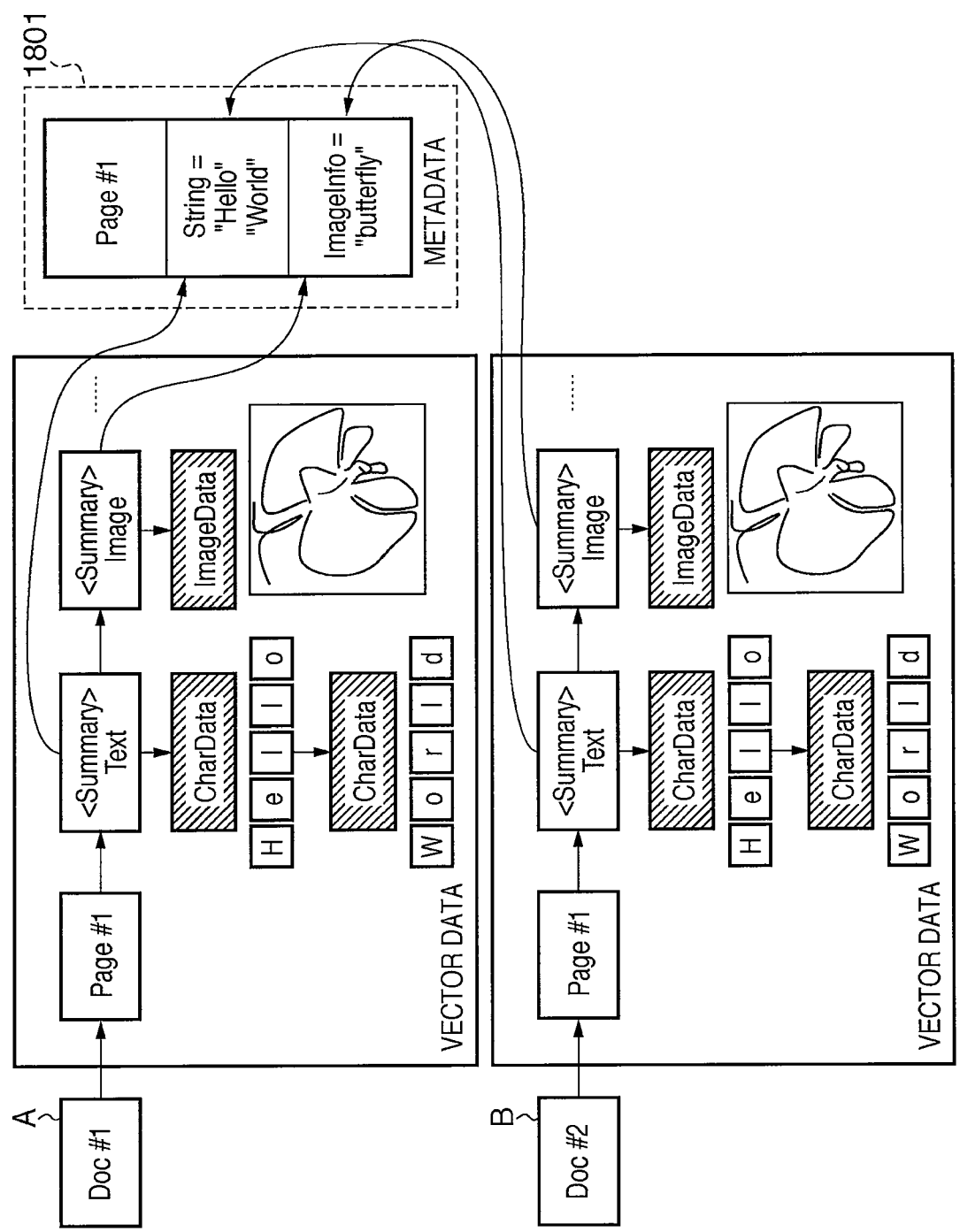
FIG. 20 is an explanatory diagram of a case where overlapping metadata is deleted according to the present embodiment.

We will now return to the description of operations according to the present embodiment. In step S502 shown in FIG. 5, control such as depicted in FIG. 19 or FIG. 20 is performed. FIG. 18 is an explanatory diagram of control of overlapping metadata according to the present embodiment. As shown in FIG. 18, hereinafter, a case will be described where documents A and B stored in a storage device of a remote MFP are combined. Documents A and B are respectively provided with vector data including a summary having texts "Hello" and "World" as attribute information and a summary having image data of a butterfly as attribute information. In addition, the documents A and B are respectively provided with metadata 1801 and metadata 1802 having identical contents.

FIG. 19 is an explanatory diagram of a case where a search object flag is used according to the present embodiment. As shown in FIG. 19, flags 1901 and 1902 are search object flags to be added to metadata. In FIG. 19, the flag 1902 is set to disable. As a result, overlapping metadata of document B is exempted from search and, for example, the CPU 305 of the local MFP does not perform search processing with respect to the metadata 1802. In addition, since the flag 1901 is set to enable, search processing is performed on the metadata 1801.

FIG. 20 is an explanatory diagram of a case where overlapping metadata is deleted, according to the present embodiment. As shown in FIG. 20, overlapping metadata 1802 of the document B has been deleted therefrom, and the document B has been changed to refer metadata of the document A. Consequently, since the document shown in FIG. 20 which combines the documents A and B includes only the metadata 1801, search processing is performed only on the metadata 1801.

Figure 21:
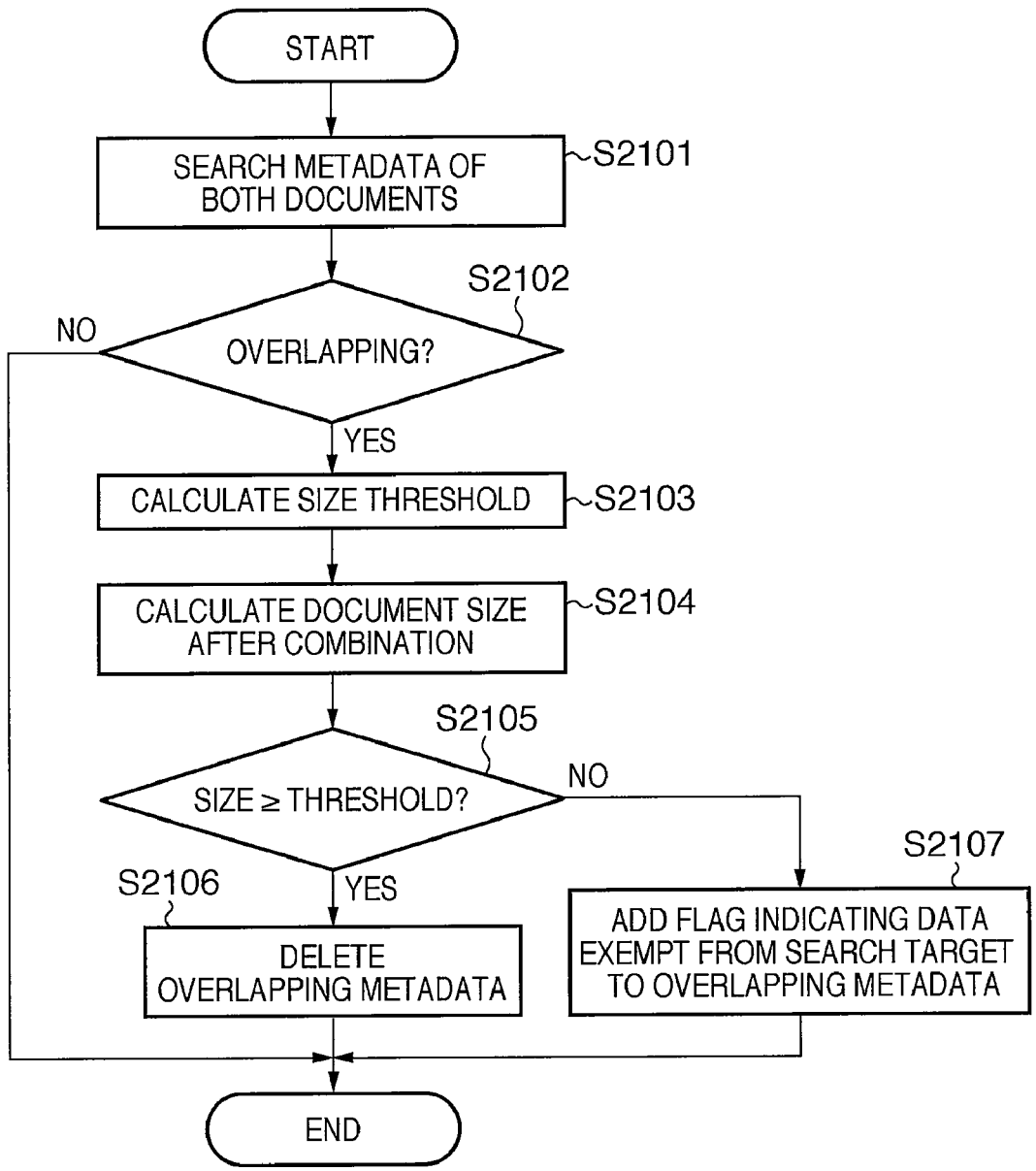
FIG. 21 is a flowchart showing procedures of the overlapping metadata control processing shown in FIG. 5.

FIG. 21 is a flowchart showing procedures of the overlapping metadata control processing shown in FIG. 5. First, in step S2101, for example, the CPU 305 of the local MFP searches for metadata of both of the documents to be combined. Next, in step S2102, a judgment is performed on the searched metadata as to whether overlapping exists. In other words, the image processing apparatus according to the present embodiment is provided with correspondence determination means that refers respective additional information data and determines whether the corresponding (identical) data exists. At this point, when it is judged that overlapping does not exist, the present flowchart is terminated and normal document combination processing is performed. On the other hand, when it is judged that overlapping exists, the procedure proceeds to step S2103 to calculate a criterial data size threshold. A description on the data size threshold will be provided later. In step S2104, a data size of the combined document is detected, and in step S2105, a judgment is performed on whether the data size of the combined document is equal to or greater than the data size threshold. In other words, the image processing apparatus according to the present embodiment is provided with size judging means that compares the data size of a document with a data size representing a threshold. At this point, if the data size of the document is equal to or greater than the threshold, the procedure proceeds to step S2106 to delete overlapping metadata. On the other hand, if the data size is smaller than the threshold, the procedure proceeds to step S2107 to add a flag indicating data exempt from search target to either one of the overlapping metadata. In this case, a flag indicating search object data is affixed to the other overlapping metadata. Such processing for adding flags to metadata (flag addition means) may be performed by the CPU 305 of the local MFP on, for example, the RAM 306. In addition, a flag indicating a search object may be denoted by "1" and a flag indicating data exempt from search target may be denoted by "0". Alternatively, other methods may be used.

Therefore, in the present embodiment, when the size of a document after combination or, in other words, the combined size is equal to or greater than a criterial data size or, in other words, a reference size, overlapping metadata is deleted. On the other hand, if the combined size is smaller than the reference size, the size of the document is judged to be sufficiently small and instead of deleting overlapping metadata, a flag is affixed so as to exempt the metadata from search processing. As shown, in the present embodiment, since overlapping metadata is deleted or a search object flag is disabled when combining documents, increased search speeds can be achieved.

Figure 22:
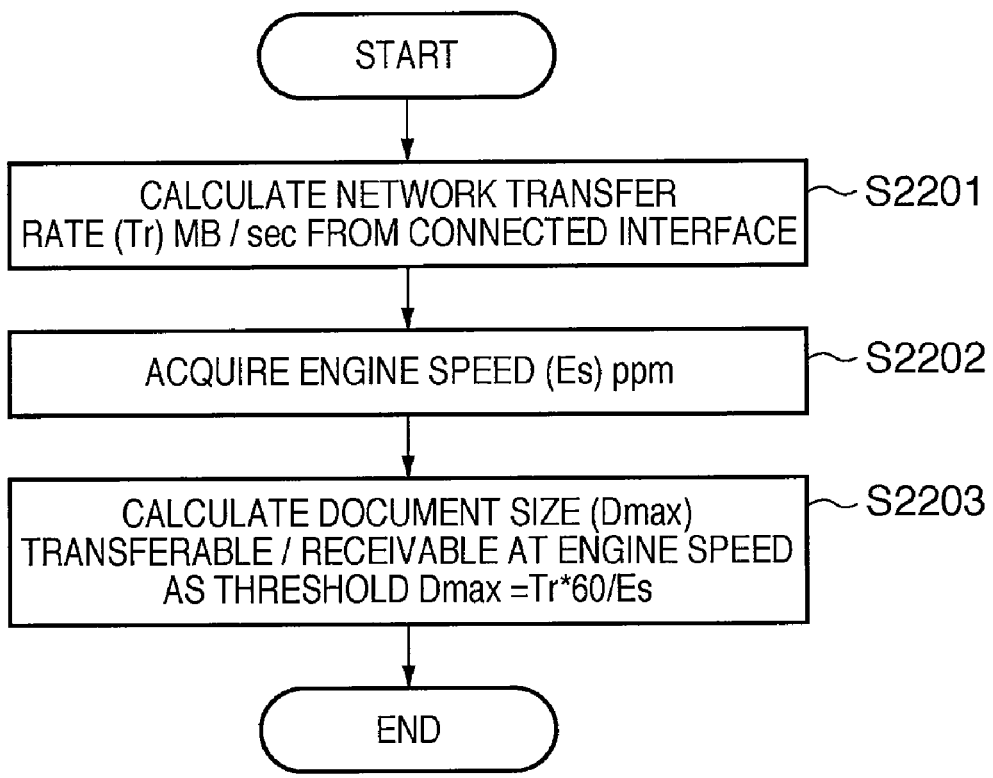
FIG. 22 is a flowchart showing procedures of size threshold calculation processing.

FIG. 22 is a flowchart showing procedures of size threshold calculation processing. As already described, in the present embodiment, a data size to be used as a threshold is calculated. First, in step S2201, a transfer rate of a network interface to which is connected the image processing apparatus is calculated. In the present embodiment, for example, if the network interface is constituted by hardware such as a general-purpose NIC (network interface card), a transfer rate may be acquired from the performance value of the hardware. In addition, if the network interface is constituted by software, a transfer rate may be calculated from CPU performance.

Next, in step S2202, a printer engine speed (hereinafter referred to as engine speed) is acquired, and the procedure proceeds to step S2203. In step S2203, a transferable and receivable document size is calculated based on the engine speed. In the present embodiment, a document size Dmax is calculated by the following formula (1).

$$D\max = Tr \times 60 / Es \quad (1)$$

In formula (1), Tr denotes a transfer rate represented in units of "MB/sec" and which indicates a file size transferable in a unit of time. Es denotes an engine speed represented in units of "page/min" and which indicates the number of pages transferable in a unit of time. Therefore, according to formula (1), a document size Dmax represented by a per-page data size can be determined.

Figure 23:
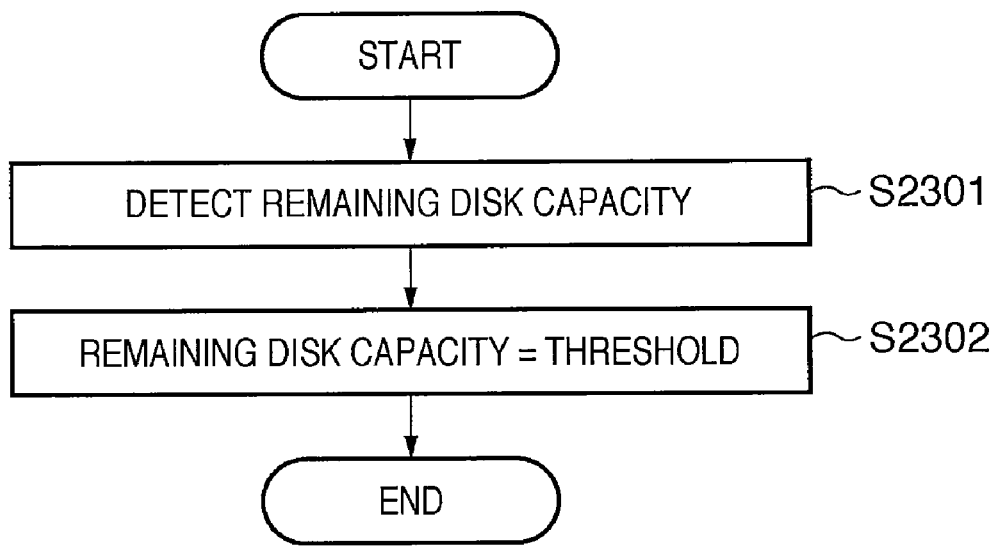
FIG. 23 is a flowchart showing other procedures of size threshold calculation processing.

FIG. 23 is a flowchart showing other procedures of size threshold calculation processing. In the present example, an unused capacity of a storage device in which documents are to be stored is determined as a threshold data size. First, in step S2301, a remaining capacity (unused available disk capacity) of a storage device such as a hard disk in which documents are stored is detected. Next, in step S2302, the remaining disk capacity itself is determined as a threshold. In the present example, deletion processing of overlapping metadata is not performed until available space in the hard disk in which documents are stored becomes limited. Therefore, since processing for deleting metadata is not performed, processing for restoring overlapping metadata need not be performed when separating a combined file.

The present invention also includes cases where functions of the embodiment described above are realized by an operating system (OS) or the like running on a computer and which performs a part or all of the actual processing based on instructions of a program (image processing program) code. In addition, the present invention is also applicable to cases where a program code read out from a storage medium is written into a memory provided either on an expansion card inserted into a computer or in an expansion unit connected to the computer. In such a case, a CPU or the like provided on the expansion card or the expansion unit performs a part of or all of the actual processing based on instructions contained in the written program code, thereby realizing the functions of the embodiment described above.

Furthermore, the present invention may be applied to a system constituted by a plurality of devices or to an apparatus consisting of a single device such as a scanner, a printer, a PC, a copier, a complex machine, a facsimile apparatus and the like. The present invention may also be achieved by directly or remotely supplying a system or an apparatus with a software program that realizes the respective functions of the above-described embodiment and causing a computer included in the system or the like to read out and execute the supplied program code. Accordingly, in order to realize the functions and processing of the present invention with a computer, the present invention may be achieved by the program code itself to be installed in the computer. In other words, the computer program itself for realizing the above-described functions and processing is also included in the present invention. In this case, as long as the functions of the program are retained, the program may take such forms as an object code, a program executed by an interpreter, script data supplied to the OS, and the like. In addition, examples of the storage medium for supplying the program may include a floppy disk, a hard disk, an optical disk, a magnetic optical disk, an MO, a CD-ROM, a CD-R, a CD-RW, and the like. Furthermore, a magnetic tape, a nonvolatile memory card, a ROM, a DVD (a DVD-ROM or a DVD-R), and the like may be used as the storage medium.

Alternatively, the program may be arranged to be downloaded from a website on the Internet or an intranet using a browser of a client computer. In other words, the program may be downloaded from the website either as the computer program itself of the present invention or a compressed file including an auto-install function to a storage medium such as a hard disk. In addition, a program code constituting the program according to the present invention may be divided into a plurality of files, whereby the respective files are to be downloaded from different websites. In other words, a program file for realizing the functions and processing of the present invention with a computer may be arranged to be downloaded to a plurality of users by a WWW (World Wide Web) server. Furthermore, the program according to the present invention may be encrypted and stored in a storage medium such as a CD-ROM to be distributed to users. In this case, key information for decrypting the encryption may be downloaded from the website via a network only to users who satisfy certain conditions, whereby the encrypted program is decrypted using the key information and executed to install the program into a computer. Moreover, the functions of the embodiment of the present invention may be realized by having a computer execute a read program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-184655, filed Jul. 13, 2007, which is hereby incorporated by reference herein in its entirety.

What is claimed is:

1. An image processing apparatus that stores a file in a storage, the image processing apparatus comprising:
a correspondence determination unit configured to determine whether or not identical metadata exist in both of two files stored in the storage when an instruction is issued by a user operation to combine the two files;
a threshold determining unit configured to determine a threshold based on at least one of (i) a transfer rate and an engine speed, and (ii) a size of an unused area in the storage which stores the combined two files,
wherein the transfer rate represents a file size transferable in a unit of time by the image processing apparatus, and the engine speed represents the number of pages transferable in a unit of time;
a size determination unit configured to compare a data size of combined two files with the determined threshold when the correspondence determination unit determines that the identical metadata exist in both of the two files;
a flag addition unit configured to add a flag indicating data exempt from search target to either one of identical metadata included in the combined two files when the size determination unit determines that the data size of the combined two files is smaller than the threshold, and configured not to delete the identical metadata, wherein the either one of identical metadata to which the flag has been added is not used for searching the combined two files, the another one of the identical metadata to which the flag has not been added is used for searching the combined two files; and
a deletion unit configured to delete either one of identical metadata included in the combined two files when the size determination unit determines that the data size of the combined two files is equal to or greater than the threshold.

2. The image processing apparatus according to claim 1, wherein, when the correspondence determination unit determines that the identical metadata do not exist in the combined two files, each metadata of the two files are combined without executing processes of the flag addition unit and the deletion unit.

3. The image processing apparatus according to claim 1, further comprising a metadata generating unit configured to generate the metadata from input data, the metadata being used for searching a file which is generated from the input data.

4. The image processing apparatus according to claim 3, further comprising:

a resolution-independent data generating unit configured to generate resolution-independent data that is not dependent on resolution from the input data;
a resolution-dependent data generating unit configured to generate, from the resolution-independent data generated by the resolution-independent data generating unit, resolution-dependent data that is dependent on resolution and which is used to be rendered into bitmap data; and
a saving unit configured to associate the resolution-independent data generated by the resolution-independent data generating unit, the metadata generated by the metadata generating unit and the resolution-dependent data generated by the resolution-dependent data generating unit and save the associated data in a storage area as the file.

5. The image processing apparatus according to claim 4, wherein the saving unit saves the file in a storage area of an external image output apparatus in response to a remote copy instruction.

6. An image processing method for storing a file in a storage, the image processing method comprising the steps of:
determining whether or not identical metadata exist in both of two files stored in the storage when an instruction is issued by a user operation to combine the two files;
determining a threshold based on at least one of (i) a transfer rate and an engine speed, and (ii) a size of an unused area in the storage which stores the combined two files,
wherein the transfer rate represents a file size transferable in a unit of time by the image processing method, and the engine speed represents the number of pages transferable in a unit of time;
comparing a data size of combined two files with the determined threshold when it is determined that the identical metadata exists in both of the combined two files;
adding a flag indicating data exempt from search target to either one of identical metadata included in the combined two files when it is determined that the data size of the combined two files is smaller than the threshold,
wherein the either one of the identical metadata to which the flag has been added is not used for searching the combined two files, the another one of the identical metadata to which the flag has not been added is used for searching the combined two files; and
deleting either one of identical metadata included in the combined two files when being judged that the data size of the combined two files is equal to or greater than the threshold.

7. A non-transitory computer-readable medium storing an image processing program for storing a file in a storage and which causes a computer
to determine whether identical metadata exist in both of two files stored in the storage when an instruction is issued by a user operation to combine the two files;
to determine a threshold based on at least one of (i) a transfer rate and an engine speed, and (ii) a size of an unused area in the storage which stores the combined two files,
wherein the transfer rate represents a file size transferable in a unit of time by the image processing program, and the engine speed represents the number of pages transferable in a unit of time;
to compare a data size of combined two files with the determined threshold when it is determined that the identical metadata exists in both of the combined two files;

to add a flag indicating data exempt from search target to either one of identical metadata included in the combined two files when it is determined that the data size of the combined two files is smaller than the threshold, wherein the either one of the identical metadata to which the flag has been added is not used for searching the combined two files, the another one of the identical metadata to which the flag has not been added is used for searching the combined two files; and to delete either one of identical metadata included in the combined two files when being judged that the data size of the combined two files is equal to or greater than the threshold.

* * * * *